United States Patent
Fröberg Olsson et al.

(10) Patent No.: US 11,695,497 B2
(45) Date of Patent: Jul. 4, 2023

(54) CONFIGURABLE DCI FORMATTING INDICATOR

(71) Applicant: Telefonaktiebolaget LM Ericsson (publ), Stockholm (SE)

(72) Inventors: Jonas Fröberg Olsson, Ljungsbro (SE); Pål Frenger, Linköping (SE); Kittipong Kittichokechai, Järfälla (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 17/054,664

(22) PCT Filed: May 10, 2019

(86) PCT No.: PCT/IB2019/053898
§ 371 (c)(1),
(2) Date: Nov. 11, 2020

(87) PCT Pub. No.: WO2019/215704
PCT Pub. Date: Nov. 14, 2019

(65) Prior Publication Data
US 2021/0075537 A1    Mar. 11, 2021

Related U.S. Application Data

(60) Provisional application No. 62/670,255, filed on May 11, 2018.

(51) Int. Cl.
*H04L 1/00*      (2006.01)
*H04W 76/11*   (2018.01)
(Continued)

(52) U.S. Cl.
CPC .......... *H04L 1/0007* (2013.01); *H04L 1/0061* (2013.01); *H04L 5/0044* (2013.01);
(Continued)

(58) Field of Classification Search
None
See application file for complete search history.

(56) References Cited

U.S. PATENT DOCUMENTS

| | | | |
|---|---|---|---|
| 2012/0182944 A1* | 7/2012 | Sorrentino | H04L 5/0044 370/329 |
| 2016/0128028 A1* | 5/2016 | Mallik | H04W 72/042 370/336 |
| 2018/0124753 A1 | 5/2018 | Sun et al. | |

OTHER PUBLICATIONS

Author Unknown, "Technical Specification Group Radio Access Network; NR; Multiplexing and channel coding (Release 15)," Technical Specification 38.212, Version 15.1.0, 3GPP Organizational Partners, Mar. 2018, 94 pages.
(Continued)

*Primary Examiner* — Peter Chen
*Assistant Examiner* — Jeff Banthrongsack
(74) *Attorney, Agent, or Firm* — Withrow & Terranova, PLLC

(57) ABSTRACT

Embodiments of a method performed by a wireless device for receiving and interpreting a Downlink Control Information (DCI) message having a flexible DCI format and embodiments of a corresponding wireless device are disclosed. In some embodiments, a method performed by a wireless device for receiving and interpreting a DCI message comprises receiving a DCI message from a base station and obtaining a DCI formatting indicator for the DCI message. The DCI formatting indicator is an indicator related to a flexible-interpretation DCI format, wherein the flexible-interpretation DCI format is a DCI format for which bits are interpreted differently based on the DCI formatting
(Continued)

indicator. The method further comprises interpreting the DCI message in accordance with the DCI formatting indicator. Embodiments of a method performed by a base station for transmitting a DCI message having a flexible DCI format and embodiments of a corresponding base station are disclosed.

26 Claims, 15 Drawing Sheets

(51) Int. Cl.
    *H04L 5/00*     (2006.01)
    *H04W 48/12*     (2009.01)
    *H04W 72/04*     (2023.01)
    *H04W 72/0453*     (2023.01)
    *H04W 72/23*     (2023.01)
    *H04W 72/53*     (2023.01)

(52) U.S. Cl.
    CPC ....... *H04W 48/12* (2013.01); *H04W 72/0453* (2013.01); *H04W 72/23* (2023.01); *H04W 72/53* (2023.01); *H04W 76/11* (2018.02)

(56) References Cited

OTHER PUBLICATIONS

Author Unknown, "Technical Specification Group Radio Access Network; NR; Multiplexing and channel coding (Release 15)," Technical Specification 38.212, Version 15.1.1, 3GPP Organizational Partners, Apr. 2018, 90 pages.

Author Unknown, "Technical Specification Group Radio Access Network; NR; Physical layer procedures for control (Release 15)," Technical Specification 38.213, Version 15.1.0, 3GPP Organizational Partners, Mar. 2018, 77 pages.

Author Unknown, "Technical Specification Group Radio Access Network; NR; Physical layer procedures for data (Release 15)," Technical Specification 38.214, Version 15.1.0, 3GPP Organizational Partners, Mar. 2018, 77 pages.

Qualcomm Incorporated, "R1-1708613: View on DCI contents," Third Generation Partnership Project (3GPP), TSG-RAN WG1#89, May 15-19, 2017, 2 pages, Hangzhou, P.R. China.

International Search Report and Written Opinion for International Patent Application No. PCT/IB2019/053898, dated Sep. 16, 2019, 15 pages.

Written Opinion for International Patent Application No. PCT/IB2019/053898, dated Apr. 7, 2020, 6 pages.

\* cited by examiner

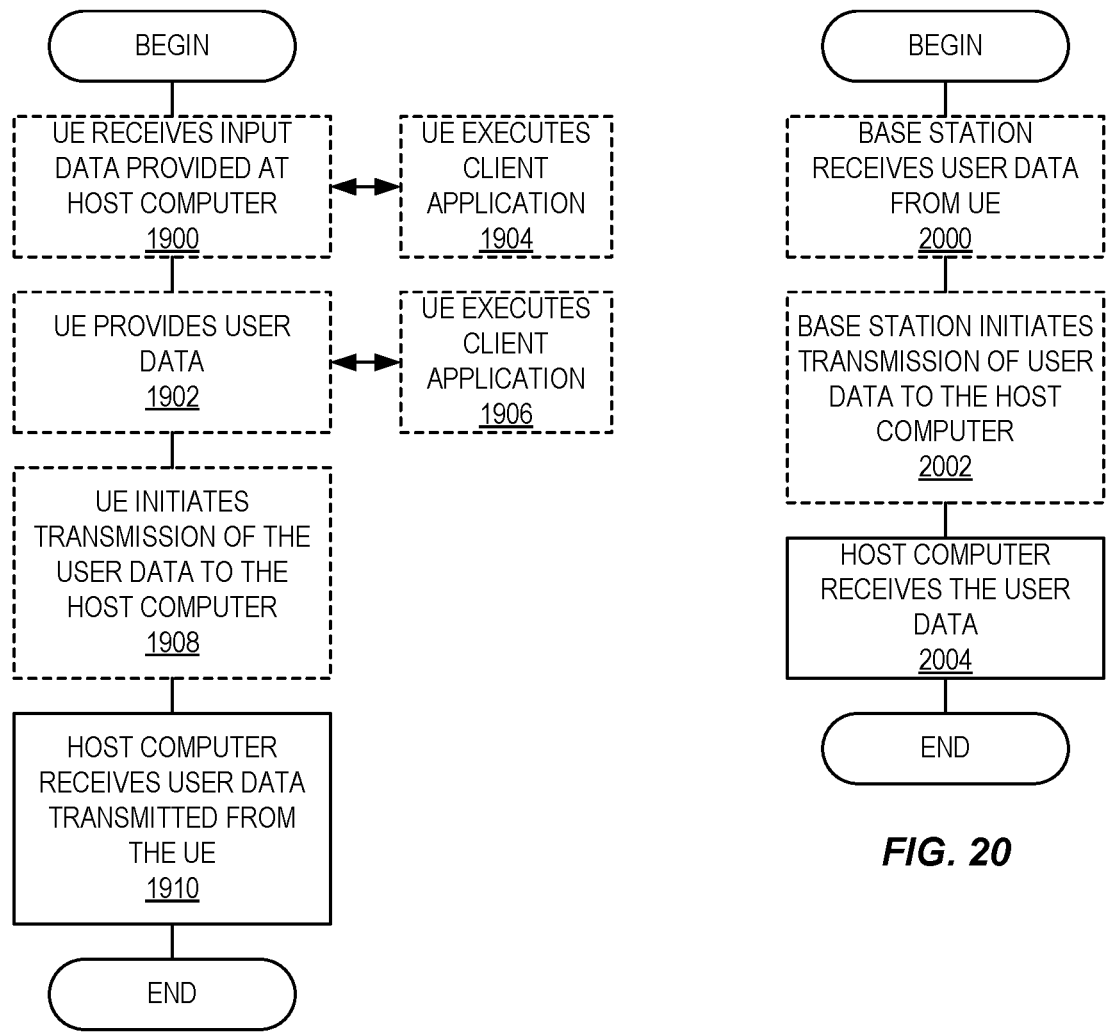

CONFIGURABLE DCI FORMATTING INDICATOR

RELATED APPLICATIONS

This application is a 35 U.S.C. § 371 national phase filing of International Application No. PCT/162019/053898, filed May 10, 2019, which claims the benefit of provisional patent application Ser. No. 62/670,255, filed May 11, 2018, the disclosures of which are hereby incorporated herein by reference in their entireties.

TECHNICAL FIELD

The present disclosure relates to Downlink Control Information (DCI) in a wireless communication system.

BACKGROUND

In wireless communication networks, the format in which data is communicated between network nodes is transmitted as control information in a specified and known way. The receiving node (e.g., User Equipment device (UE) in a Long Term Evolution (LTE) network) first decodes the control information that contains information on the transport format of the transmitted data. Examples of the formatting information are:
 allocation (where the data is located, typically in frequency),
 number of layers used,
 modulation and coding information,
 demodulation reference symbols,
 etc.

In New Radio (NR), there are four Downlink Control Information (DCI) formats used for downlink (DL) data assignments and uplink (UL) data grants. For DL and UL respectively, there are two different formats each, wherein a first format is used in initial access while the second format is used after initial access when more advanced features are enabled. The size of the second format is larger than the first format.

A DCI (also referred to herein as a DCI message) is transmitted over a Physical Downlink Control Channel (PDCCH) and is blindly searched for by the UE. This search is performed by the UE by performing one or more decoding attempts based on a hypothetical PDCCH located in a predefined time-frequency location, called a search space entry. When the UE performs a decoding attempt, the UE assumes a certain size of the DCI. This means that the UE needs to perform two decoding attempts, namely, one decoding attempt to try to find the larger DCI and another decoding attempt to try to find the smaller DCI.

The set of time-frequency locations where a PDCCH may be received is called a search space. In NR, the region of time-frequency resources in which the search space is defined is called Control Region Set (CORESET) and can be configured to be very flexible. A UE can have several CORESETs configured.

There currently exist certain challenge(s). In NR (and also in LTE Release (Rel) 15), there is high attention of providing support for Ultra-Reliable Low-Latency Communication (URLLC) services. There is an ongoing discussion on the need for a DCI format for URLLC needs.

SUMMARY

Systems and methods are disclosed herein relating to transmitting, receiving, and interpreting a Downlink Control Information (DCI) message having a flexible DCI format. Embodiments of a method performed by a wireless device for receiving and interpreting a DCI message are disclosed. In some embodiments, a method performed by a wireless device for receiving and interpreting a DCI message comprises receiving a DCI message from a base station and obtaining a DCI formatting indicator for the DCI message. The DCI formatting indicator is an indicator related to a flexible-interpretation DCI format, wherein the flexible-interpretation DCI format is a DCI format for which bits are interpreted differently based on the DCI formatting indicator. The method further comprises interpreting the DCI message in accordance with the DCI formatting indicator.

In some embodiments, the method further comprises receiving, from the base station, a configuration of a DCI formatting indicator size, wherein a size of the DCI formatting indicator is equal to the DCI formatting indicator size. Further, in some embodiments, receiving the configuration of the DCI formatting indicator size comprises receiving the configuration of the DCI formatting indicator size via higher layering signaling.

In some embodiments, the DCI formatting indicator is an explicit indicator.

In some embodiments, the DCI formatting indicator is comprised in the DCI message, and obtaining the DCI formatting indicator comprises obtaining the DCI formatting indicator from the DCI message.

In some embodiments, the DCI formatting indicator is an implicit indictor. In some embodiments, the DCI formatting indicator is an implicit DCI formatting indicator, and obtaining the DCI formatting indicator comprises determining a Radio Network Temporary Identifier (RNTI) used for the DCI message, wherein the RNTI is the implicit DCI formatting indicator. In some other embodiments, the DCI formatting indicator is an implicit DCI formatting indicator, and obtaining the DCI formatting indicator comprises determining a Control Region Set (CORESET) or search space in which the DCI message is received, wherein the determined CORESET or search space is the implicit DCI formatting indicator. In some other embodiments, the DCI formatting indicator is an implicit DCI formatting indicator, and obtaining the DCI formatting indicator comprises determining a transmission mode or monitoring format parameter, wherein the determined transmission mode or monitoring format parameter is the implicit DCI formatting indicator.

In some embodiments, obtaining the DCI formatting indicator comprises determining Cyclic Redundancy Check (CRC) masking for a CRC of the DCI message, wherein the DCI formatting indicator is embedded into the CRC masking.

In some embodiments, the DCI formatting indicator is a combination of an explicit indication and an implicit indication. In some embodiments, the explicit indication is comprised in the DCI message, and the implicit indication is: a RNTI used for the DCI message, a CORESET or search space in which the DCI message is received, an indication embedded into a CRC masking for a CRC of the DCI message, or a transmission mode or monitoring format parameter.

In some embodiments, interpreting the DCI message in accordance with the DCI formatting indicator comprises determining a predefined or preconfigured DCI format interpretation for the obtained DCI formatting indicator and interpreting the DCI message in accordance with the predefined or preconfigured DCI format interpretation.

In some embodiments, the method further comprises obtaining a configuration of a start time for interpreting DCI messages in accordance with the DCI formatting indicator, wherein the steps of receiving the DCI message, obtaining the DCI formatting indicator, and interpreting the DCI message are performed after the start time. In some embodiments, the method further comprises, prior to the start time, receiving another DCI message from the base station and interpreting the other DCI message in accordance with legacy DCI format interpretation.

In some embodiments, interpreting the DCI message in accordance with the DCI formatting indicator comprises interpreting the DCI message in accordance with a normal DCI format interpretation if the DCI formatting indicator is a first value; and, if the DCI formatting indicator is a second value, determining a predefined or preconfigured DCI format interpretation mapped to the second value of the DCI formatting indicator and interpreting the DCI message in accordance with the predefined or preconfigured DCI format interpretation.

In some embodiments, the DCI message is for a current transmission scheduled for the wireless device, and the method further comprises updating a subset of parameters received in a prior DCI message for a prior transmission scheduled for the wireless device based on information received in the DCI message, as interpreted in accordance with the DCI formatting indicator.

Embodiments of a wireless device for receiving and interpreting a DCI message are also disclosed. In some embodiments, a wireless device for receiving and interpreting a DCI message is adapted to receive a DCI message from a base station and obtain a DCI formatting indicator for the DCI message, wherein the DCI formatting indicator is an indicator related to a flexible-interpretation DCI format, wherein the flexible-interpretation DCI format is a DCI format for which bits are interpreted differently based on the DCI formatting indicator. The wireless device is further adapted to interpret the DCI message in accordance with the DCI formatting indicator.

In some embodiments, a wireless device for receiving and interpreting a DCI message comprises one or more receivers and processing circuitry associated with the one or more transmitters and the one or more receivers. The processing circuitry is configured to cause the wireless device to receive a DCI message from a base station and obtain a DCI formatting indicator for the DCI message, wherein the DCI formatting indicator is an indicator related to a flexible-interpretation DCI format, wherein the flexible-interpretation DCI format is a DCI format for which bits are interpreted differently based on the DCI formatting indicator. The processing circuitry is further configured to cause the wireless device to interpret the DCI message in accordance with the DCI formatting indicator.

Embodiments of a method performed by a base station for providing DCI having a flexible-interpretation are also disclosed. In some embodiments, a method performed by a base station for providing DCI having a flexible-interpretation comprises transmitting a DCI message to a wireless device, and providing, to the wireless device, a DCI formatting indicator for the DCI message. The DCI formatting indicator is an indicator related to a flexible-interpretation DCI format, wherein the flexible-interpretation DCI format is a DCI format for which bits are interpreted differently based on the DCI formatting indicator.

In some embodiments, the method further comprises providing, to the wireless device, a configuration of a DCI formatting indicator size, wherein a size of the DCI formatting indicator is equal to the DCI formatting indicator size. In some embodiments, providing the configuration of the DCI formatting indicator size comprises transmitting the configuration of the DCI formatting indicator size to the wireless device via higher layering signaling.

In some embodiments, the DCI formatting indicator is an explicit indicator.

In some embodiments, the DCI formatting indicator is comprised in the DCI message, and providing the DCI formatting indicator comprises providing the DCI formatting indicator in the DCI message.

In some embodiments, the DCI formatting indicator is an implicit indictor. In some embodiments, the DCI formatting indicator is an implicit DCI formatting indicator, and providing the DCI formatting indicator comprises transmitting the DCI message using a specific RNTI, wherein the specific RNTI is the implicit DCI formatting indicator. In some embodiments, the DCI formatting indicator is an implicit DCI formatting indicator, and providing the DCI formatting indicator comprises transmitting the DCI message within a CORESET or search space, wherein the CORESET or search space is the implicit DCI formatting indicator. In some embodiments, the DCI formatting indicator is an implicit DCI formatting indicator, and providing the DCI formatting indicator comprises providing, to the wireless device, a configuration of a transmission mode or monitoring format parameter, wherein the configuration of the transmission mode or monitoring format parameter is the implicit DCI formatting indicator.

In some embodiments, providing the DCI formatting indicator comprises embedding the DCI formatting indicator within a CRC masking for a CRC of the DCI message.

In some embodiments, the DCI formatting indicator is a combination of an explicit indication and an implicit indication. In some embodiments, the explicit indication is comprised in the DCI message, and the implicit indication is: a RNTI used for the DCI message, a CORESET or search space in which the DCI message is received, an indication embedded into a CRC masking for a CRC of the DCI message, or a transmission mode or monitoring format parameter.

In some embodiments, the method further comprises providing, to the wireless device, a configuration of a start time for interpreting DCI messages in accordance with the DCI formatting indicator.

Embodiments of a base station for providing DCI having a flexible-interpretation are also disclosed. In some embodiments, a base station for providing DCI having a flexible-interpretation is adapted to transmit a DCI message to a wireless device, and provide, to the wireless device, a DCI formatting indicator for the DCI message, wherein the DCI formatting indicator is an indicator related to a flexible-interpretation DCI format, wherein the flexible-interpretation DCI format is a DCI format for which bits are interpreted differently based on the DCI formatting indicator.

In some embodiments, a base station for providing DCI having a flexible-interpretation comprises processing circuitry configured to cause the base station to transmit a DCI message to a wireless device, and provide, to the wireless device, a DCI formatting indicator for the DCI message, wherein the DCI formatting indicator is an indicator related to a flexible-interpretation DCI format, wherein the flexible-interpretation DCI format is a DCI format for which bits are interpreted differently based on the DCI formatting indicator.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 17 through 20 are flow charts illustrating methods implemented in a communication system such as that of FIGS. 15 and 16.

DETAILED DESCRIPTION

Figure 1:
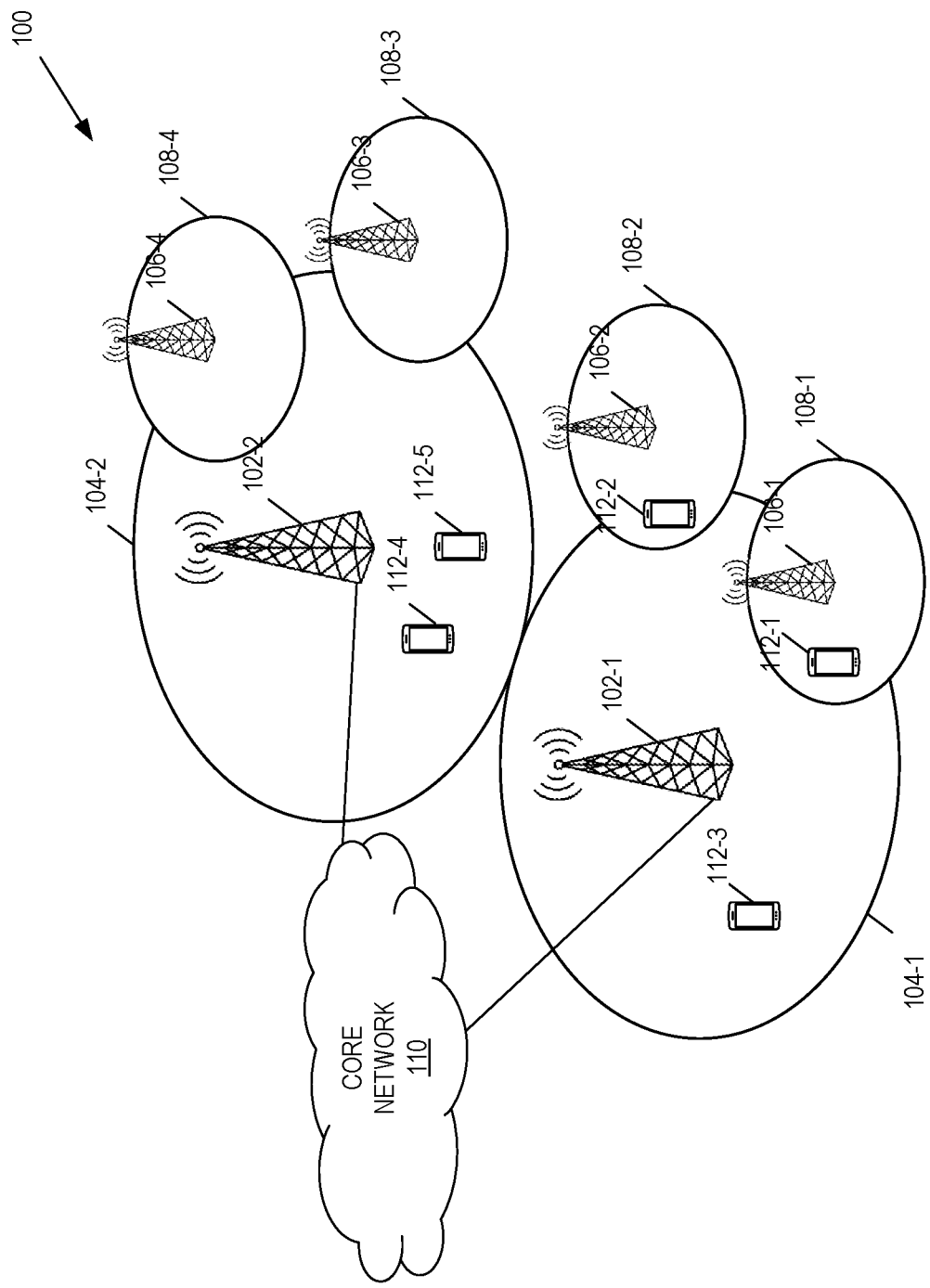
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

As discussed above, in NR (and also in LTE Release (Rel) 15), there is high attention of providing support for Ultra-Reliable Low-Latency Communication (URLLC) services. There is an ongoing discussion on the need for a Downlink Control Information (DCI) format for URLLC needs. The reason is that URLLC needs an extremely reliable transmission of DCI with an error rate requirement as low as $10^{-5}$ or lower. A transmission of a smaller DCI is more robust than a larger DCI for the same amount of consumed resources. Alternatively, a smaller DCI consumes less resources than a larger DCI for the same reliability, which means that, on a limited PDCCH resource, more DCIs can be transmitted while maintaining a robustness target.

In NR, the smaller DCI for uplink (UL) grants is called Format 0_0. 3 GPP Technical Specification (TS) 38.212 V15.1.1 defines the fields included in Format 0_0 as follows: DCI format 0_0 is used for the scheduling of PUSCH in one cell.

The following information is transmitted by means of the DCI format 0_0 with CRC scrambled by C-RNTI:

Identifier for DCI formats—1 bit
    The value of this bit field is always set to 0, indicating an UL DCI format Frequency domain resource assignment—$\lceil \log_2(N_{RB}^{ULBWP}(N_{RB}^{ULBWP}+1)/2)\rceil$ bits where
    $N_{RB}^{ULBWP}$ is the size of the initial bandwidth part in case DCI format 0_0 is monitored in the common search space
    $N_{RB}^{ULBWP}$ is the size of the active bandwidth part in case DCI format 0_0 is monitored in the UE specific search space and satisfying
        the total number of different DCI sizes monitored per slot is no more than 4, and
        the total number of different DCI sizes with C-RNTI monitored per slot is no more than 3

For PUSCH hopping with resource allocation type 1:
    $N_{UL\_hop}$ MSB bits are used to indicate the frequency offset according to Subclause 6.3 of [6, TS 38.214], where $N_{UL\_hop}=1$ if the higher layer parameter Frequency-hopping-offsets-set contains two offset values and $N_{UL\_hop}=2$ if the higher layer parameter Frequency-hopping-offsets-set contains four offset values $\lceil \log_2(N_{RB}^{ULBWP}(N_{RB}^{ULBWP}+1)/2)\rceil - N_{UL\_hop}$ bits provides the frequency domain resource allocation according to Subclause 6.1.2.2.2 of [6, TS 38.214]

For non-PUSCH hopping with resource allocation type 1:

$\lceil \log_2(N_{RB}^{ULBWP}(N_{RB}^{ULBWP}+1)/2)\rceil$ bits provides the frequency domain resource allocation according to Subclause 6.1.2.2.2 of [6, TS 38.214]

Time domain resource assignment—X bits as defined in Subclause 6.1.2.1 of [6, TS 38.214]

Frequency hopping flag—1 bit.

Modulation and coding scheme—5 bits as defined in Subclause 6.1.3 of [6, TS 38.214]

New data indicator—1 bit

Redundancy version—2 bits as defined in Table 7.3.1.1.1-2

HARQ process number—4 bits

TPC command for scheduled PUSCH—[2] bits as defined in Subclause x.x of [5, TS 38.213]

UL/SUL indicator—1 bit for UEs configured with SUL in the cell as defined in Table 7.3.1.1.1-1 and the number of bits for DCI format 1_0 before padding is larger than the number of bits for DCI format 0_0 before padding; 0 bit otherwise.

If the UL/SUL indicator is present in DCI format 0_0 and the higher layer parameter dynamicPUSCHSUL is set to Disabled, the UE ignores the UL/SUL indicator field in DCI format 0_0, and the corresponding PUSCH scheduled by the DCI format 0_0 is for the carrier indicated by the higher layer parameter pucchCarrierSUL;

If the UL/SUL indicator is not present in DCI format 0_0, the corresponding PUSCH scheduled by the DCI format 0_0 is for the carrier indicated by the higher layer parameter pucchCarrierSUL.

However, it was understood that, if a new DCI format is to be introduced, the size of this new DCI format is to equal one of the available DCI sizes. However, this creates an issue in that, if two or more DCI formats use the same DCI size, there is currently no way to tell the UE which of these two or more DCI formats is to be used when interpreting a DCI message. In other words, since the UE interprets the contents of DCI based on Radio Network Temporary Identifier (RNTI), the size of the DCI, and what features are enabled, except for a downlink (DL)/UL distinguishing bit in the DCI, there is currently no way to tell the UE whether a received DCI using a specific RNTI is to be interpreted according to a first or second formatting.

Certain aspects of the present disclosure and their embodiments may provide solutions to the aforementioned or other challenges.

In some embodiments, a configurable-sized DCI formatting indicator is proposed to indicate the formatting of the DCI. In some embodiments, the DCI formatting indicator points to an entry in a higher layer configured table. The higher layer configured table may be configured by Radio Resource Control (RRC).

The present disclosure further teaches a method of defining the DCI formatting indicator with a configurable size (e.g., X bits, where X is configured by higher layers) in the DCI. An indicator with a fixed bit-width would either not be forward compatible enough (e.g., in case the indicator consists of a single bit then new formats cannot be added in the future) or too expensive (e.g., in case the indicator consists of two or more bits then valuable DCI bits will be wasted for all UEs that only need to support two formats).

The present disclosure also teaches a method when the DCI formatting indicator is implicitly indicated in the scrambling of Cyclic Redundancy Check (CRC) of the DCI.

In some embodiments, when the size of the DCI formatting indicator is zero bits, there is no need to dynamically switch between different formatting. For such embodiments, the DCI formatting indicator is part of higher layer configuration such as RRC or associated with a configured parameter such as Transmission Mode (TM) or monitoring format parameters to which the DCI formats for UE to monitor are connected. For such embodiments, switching between different formatting uses RRC reconfiguration.

In some embodiments of the present disclosure, DCI formatting indication is introduced to indicate an entry in a higher layer configured table where the formatting of the DCI is defined. The indication may be explicit using one or more bits in the DCI (see, e.g., FIG. 4) but can also be implicit (see, e.g., FIG. 3) where the indication is based on one or more out of:

RRC configuration, how the DCI was received, e.g. RNTI used, on which Control Region Set (CORESET)/search space it was received, indication scrambled with the DCI CRC, based on configured parameters such as TM or monitoring format parameter to which the DCI formats for UE to monitor are connected.

The indication can also combine explicit and implicit techniques wherein, e.g., a first set of different DCI formatting is associated with a first CORESET while a second set of different DCI formatting is associated with a second CORESET.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Systems and methods are disclosed herein that relate to a flexible-interpretation DCI format. As used herein, a flexible-interpretation DCI format is a DCI format for which the interpretation of DCI for that DCI format is flexible. In other words, bits in a DCI message received by a UE (e.g., a wireless device 112) are interpreted by the UE based on a "DCI formatting indicator" that is communicated, explicitly or implicitly, to the UE for the DCI message, where different values of the DCI formatting indicator result in different interpretations of the bits in the DCI message.

In some embodiments, the DCI formatting indicator is a configurable-size DCI formatting indicator, and systems and methods for configuring a DCI formatting indicator size are disclosed.

tion DCI message based on this implicit indication (e.g., how it was received, e.g., using a specific RNTI, on a specific Physical Downlink Control Channel (PDCCH) CORESET or in a specific search space).

In some embodiments, there is additionally an "Identifier for DCI formats" (as in Format 0_0 above) identifying if the DCI is with respect to DL or UL. In such embodiments, the DCI formatting indicator may, for example, point to an entry in a DL table or an UL table, respectively, that defines the desired interpretation for the respective DCI message, depending on the value of "Identifier for DCI formats."

The DCI formatting indicator may, in some embodiments, indicate an entry in a higher layer configured table. For example, the UE may be configured with one or more Flexible-DCI-interpretation RRC information elements such as

```
Flexible-DCI-interpretation ::=                          SEQUENCE {
    -- Identifier for this DCI formatting
    flexible-DCI-ID                                      INTEGER{1..maxNrofFlexibleDCIs}
    -- Number of bits for frequency domain allocatio
    frequency-domain-resource-assignment-DCI-bits        ENUMERATED {x1, x2}
    -- Number of bits for time domain allocation
    time-domain-resource-assignment-DCI-bits             ENUMERATED {y1, y2}
    frequency-hopping-flag-DCI-bits                      ENUMERATED {1}
    -- Number of bits for modulation and coding scheme
    modulation-and-coding-scheme-DCI-bits                ENUMERATED {val3, val5}
    ...
```

More specifically, in some embodiments, systems and methods disclosed herein define a flexible-interpretation DCI format for sending and receiving DCI (also referred to herein as a DCI message) according to:

DCI formatting indicator—X bits
field1, field2, . . . , fieldN

The meaning of the fields field1, field2, . . . , fieldN and the sizes of the fields (i.e., the number of bits in the fields) for two or more different interpretations of the bits in a DCI message of the flexible-interpretation DCI format are predefined or configured via higher layer signaling (e.g., RRC signaling). In some embodiments, a UE (e.g., a wireless device 112) is configured to interpret, e.g., DCI format 0_0 such that a 1-bit DCI formatting indicator is added as a field. In such an embodiment, a value of '0' for the DCI formatting indicator indicates to the UE that the UE is to interpret the other bit fields of the DCI according to a first interpretation (e.g., a normal or default interpretation), whereas a value of '1' for the DCI formatting indicator indicates to the UE that the UE is to interpret the other bit fields of DCI according to a second interpretation, where the second interpretation is different than the first interpretation. The different interpretations for the DCI are referred to herein as different DCI interpretations or different DCI format interpretations, or simply as different interpretations. In other words, for the same DCI format, two or more different interpretations of the bits in respective DCI messages using that DCI format are predefined or preconfigured, where these different interpretations define different sets of fields and/or different number of bits in the fields of the DCI message. As discussed below, in some embodiments, the DCI formatting indicator is an explicit indicator (e.g., X bits) in the DCI message, in which case the DCI formatting indicator is present in the DCI message, e.g., if the UE is configured with flexible DCI interpretation. In some embodiments, the DCI formatting indicator is an implicit indication, in which case the UE interprets a received DCI message as a flexible-interpreta- Using embodiments of the present disclosure, different DCI interpretations that can be dynamically signaled to the UE needing to perform an additional decoding attempt or needing to be addressed using multiple RNTIs. For example, a first entry of the Flexible-DCI-interpretation table may be the fallback DCI Format 0_0 while other entries may indicate use of selected features such as UL precoding. Another example is that an entry specifies URLLC DCI formatting. In such other example, fewer bits are used for frequency-domain-resource-assignment and for indicating Modulation and Coding Scheme (MCS). The fewer bits may identify entries in subsets of "normal" sets of frequency-domain-resource-assignment and MCS. For example, MCS is "normally" indicated using 5 bits while a new entry using 3 bits may be defined to indicate the 8 lowest MCS values when the UE is located in bad radio conditions while indicating the 8 highest MCS values when the UE is in good radio conditions. Hence, when the UE is moving around the entry in the table may be updated to a suitable operating point for the MCS depending on the radio conditions.

Another example is that, by using fewer bits in some of the fields in, e.g., DCI Format 0_0, there may be bits that can be used to indicate a UL precoder without needing to use the much larger-sized DCI Format 0_1. For URLLC, robustness can hence be increased by using only lower-rank UL precoders without introducing additional load on PDCCH that would otherwise be caused if DCI Format 0_1 would be used. Apart from the precoder information, some new bit fields useful for URLLC operation can also be included such as, for example, fields relating to repetition factor/number and MCS table selection indicator.

Embodiments of the present disclosure also enable forward compatibility using fixed-sized DCI payload wherein new fields for future releases can be defined. In some embodiments, the number of bits used for the DCI formatting indicator (particularly for the embodiments in which the DCI formatting indicator is explicitly included in the DCI message) is configured by higher layer (e.g., RRC) which enables a mechanism to set a suitable maximum number of different DCI interpretations that is desired to dynamically switch between.

Yet another example where embodiments of the present disclosure can be applied is where the UE is configured to use an advanced transmission mode in which the UE is required to indicate many transmission parameters. To indicate to the UE how to transmit, e.g., DCI format 0_1 may be needed every time the UE is to be scheduled in the advanced mode. For such examples, embodiments of the present disclosure may be used to provide a smaller-sized DCI consisting of only those transmission parameters in DCI format 0_1 that are frequently updated. In such examples, the flexible-DCI-interpretation RRC information element used to define a DCI interpretation for the DCI message may comprise Boolean indicators (or a bitmap) for a subset of fields of the larger-sized DCI message indicating whether the field is present or not in smaller-sized DCI.

There may be an agreement (e.g., by specification) between the UE and the network that the UE stores parameters indicated in received DCI Format 0_1 which is not indicated by smaller sized-DCI where, when receiving the smaller-sized DCI, the transmission parameters indicated in the smaller-sized DCI together with stored transmission parameters are used in the granted transmission.

The network (e.g., base station) may hence first schedule the UE using DCI Format 0_1 with a full list of transmission parameters and then use the smaller sized-DCI for subsequent grants. To avoid error propagation, the network (e.g., base station) should wait until it is sure the UE received the grant using larger-sized DCI before switching to smaller-sized DCI. One method to be sure the UE correctly received the larger-sized DCI is that the network correctly decoded the transmission granted using the larger-sized DCI.

The embodiments described above relate to UL DCI, but concepts described herein may also be applied for DL DCI.

When the size of DCI formatting indicator is X=0 bits (e.g., no explicit indication in the DCI), the DCI format interpretation can be done directly via RRC configuration or by some implicit indication. Zero bits for the DCI formatting indicator may be used when there is no need to dynamically switch between different formatting; change of formatting is performed on a slower time basis using RRC.

In one embodiment, DCI interpretation is RRC configured. There exist RRC parameters indicating:
  whether the new DCI interpretation associated with new DCI format is used, or
  which DCI format interpretation (from the DCI interpretation table containing entries of different DCI formats with the same size) is used.

In another embodiment, DCI interpretation is done via some implicit indication.

In one example, the implicit indication is obtained from some configured parameter such as TM or monitoring format parameter to which the DCI formats for the UE to monitor are connected.

In another example, the implicit indication is obtained by checking validity of one or multiple DCI fields according to the normal interpretation or validity of one or multiple DCI fields in connection to other configured parameters (e.g., TM).

Figure 2:
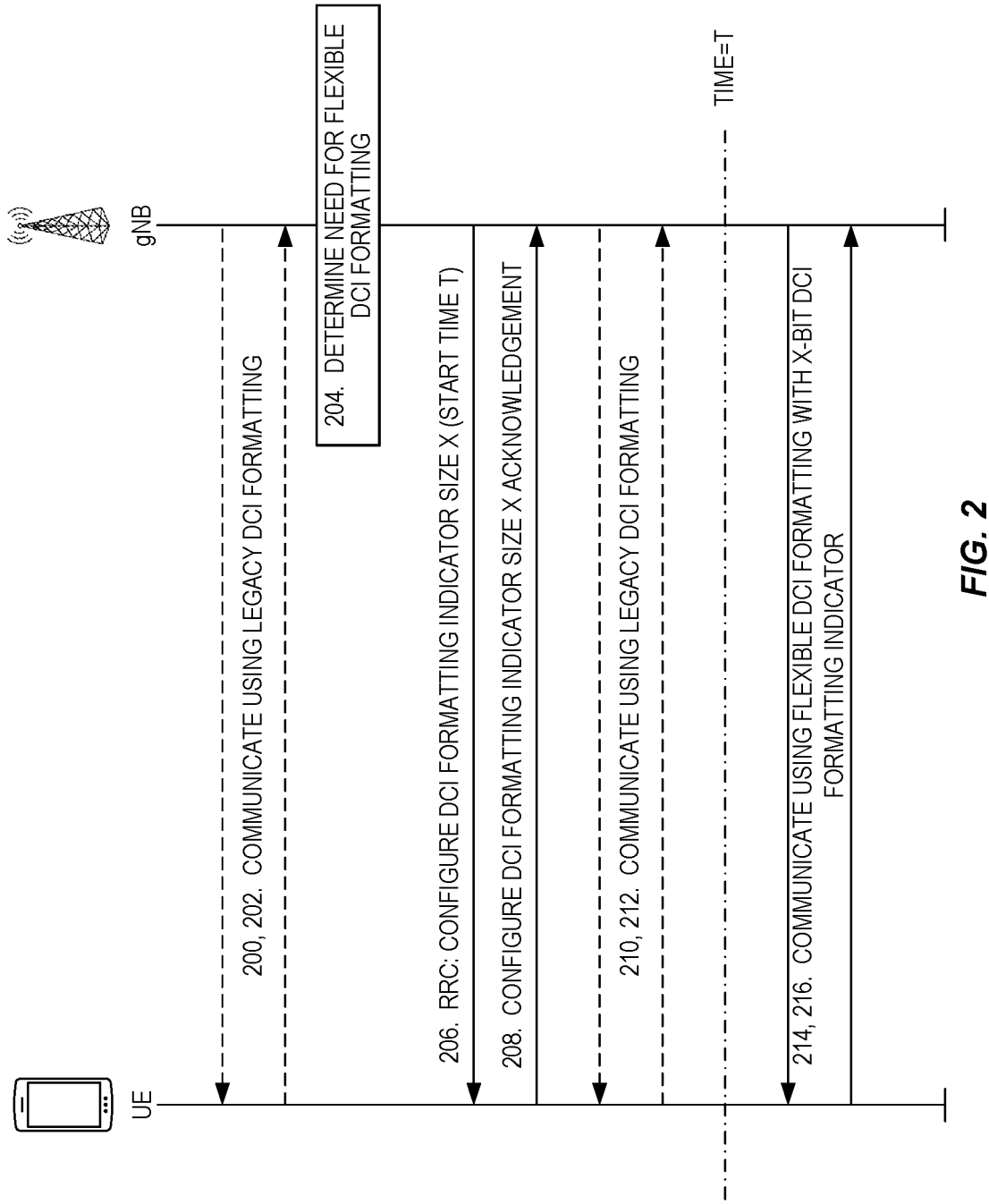
FIG. 2 illustrates the operation of a base station and a wireless device in accordance with some embodiments of the present disclosure.

FIG. 2 illustrates the operation of a base station (e.g., a base station 102) and a wireless device (e.g., a wireless device 112) in accordance with some embodiments of the present disclosure. In this example, the base station is a gNB, and the wireless device is a UE. In particular, FIG. 2 illustrates one example scenario where the UE and gNB switch from communicating using a "legacy DCI format" interpretation to using the new interpretation. As illustrated, the UE and the gNB initially communicate using a legacy DCI format (steps 200, 202). In other words, the gNB transmits DCI message(s) and the UE receives and interprets the DCI message(s) in accordance with a legacy interpretation of a DCI format. In this example, the gNB determines that the flexible-interpretation DCI format is needed and therefore configures the UE for flexible-interpretation DCI format operation (step 204).

In this example, an explicit DCI formatting indicator is used, and the gNB configures the UE with a DCI formatting indictor size (i.e., the number of bits used for the DCI formatting indicator) and a start time (T) (i.e., a time reference that indicates when flexible DCI interpretation is to be applied by the UE) (step 206). Notably, configuring the DCI formatting indicator size is optional, particularly when the DCI formatting indicator is implicit. Also, configuring the start time (T) is also optional. The start time may be otherwise be defined or determined by the UE (e.g., configured by lower layer signaling). The UE optionally acknowledges receipt of the configuration (step 208). In the illustrated example, before the start time, the legacy interpretation is used (steps 210, 212), while after the start time the flexible interpretation is used (steps 214, 216).

When communicating using the flexible-interpretation DCI, the gNB transmits a DCI message to the UE (e.g., scheduling a UL transmission from the UE or a DL transmission to the UE). In this example, the gNB includes a DCI formatting indicator in the DCI message, where the size of the DCI formatting indicator is equal to the configured size. At the UE, the UE receives the DCI message, obtains the DCI formatting indicator, and interprets the DCI message in accordance with the DCI formatting indicator. The UE then proceeds to transmit or receive in accordance with the DCI message.

Figure 3:
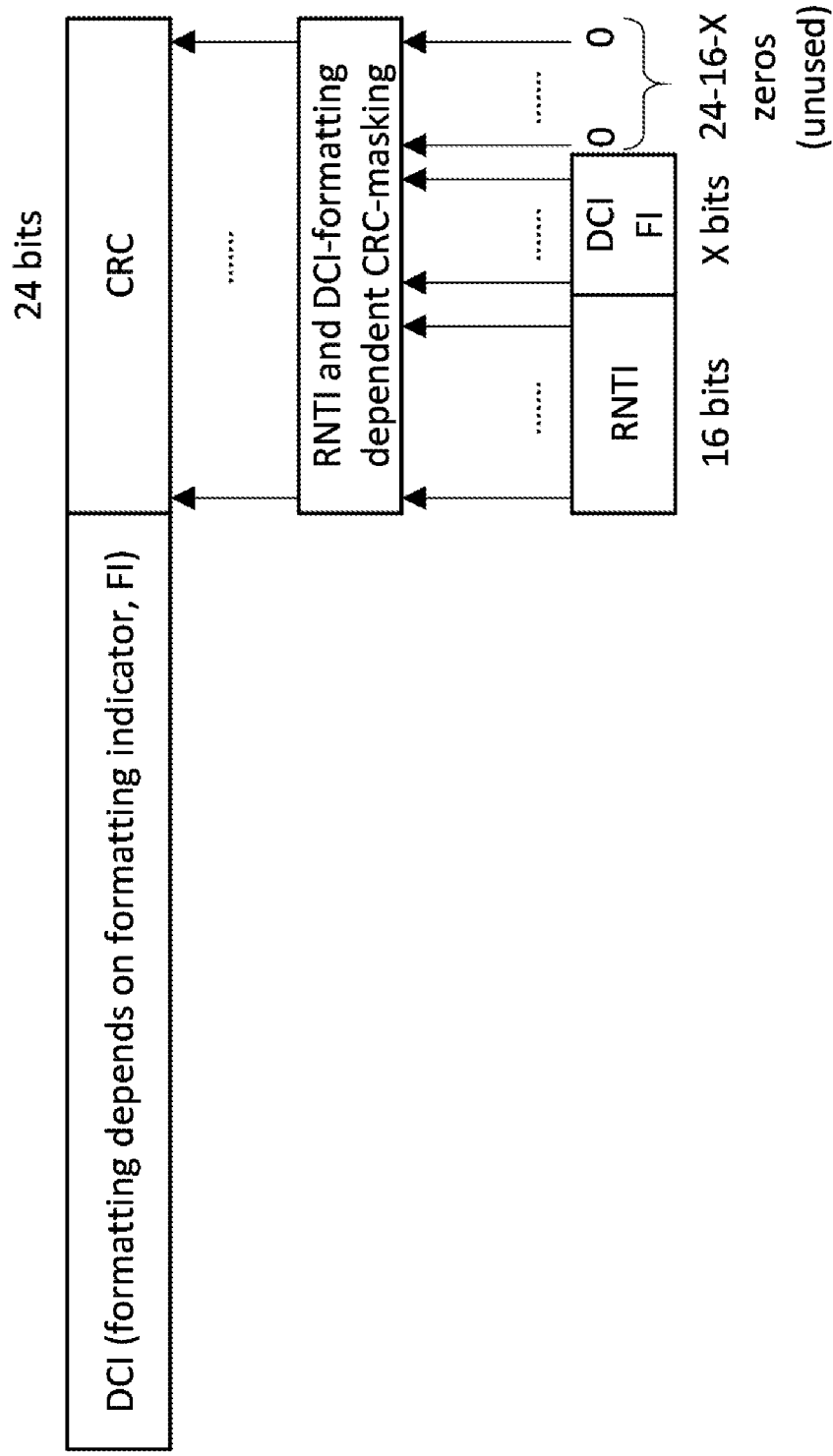
FIG. 3 illustrates an embodiment in which a Downlink Control Information (DCI) formatting indicator is embedded into a Cyclic Redundancy Check (CRC) mask of the CRC of the DCI message.
Figure 4:
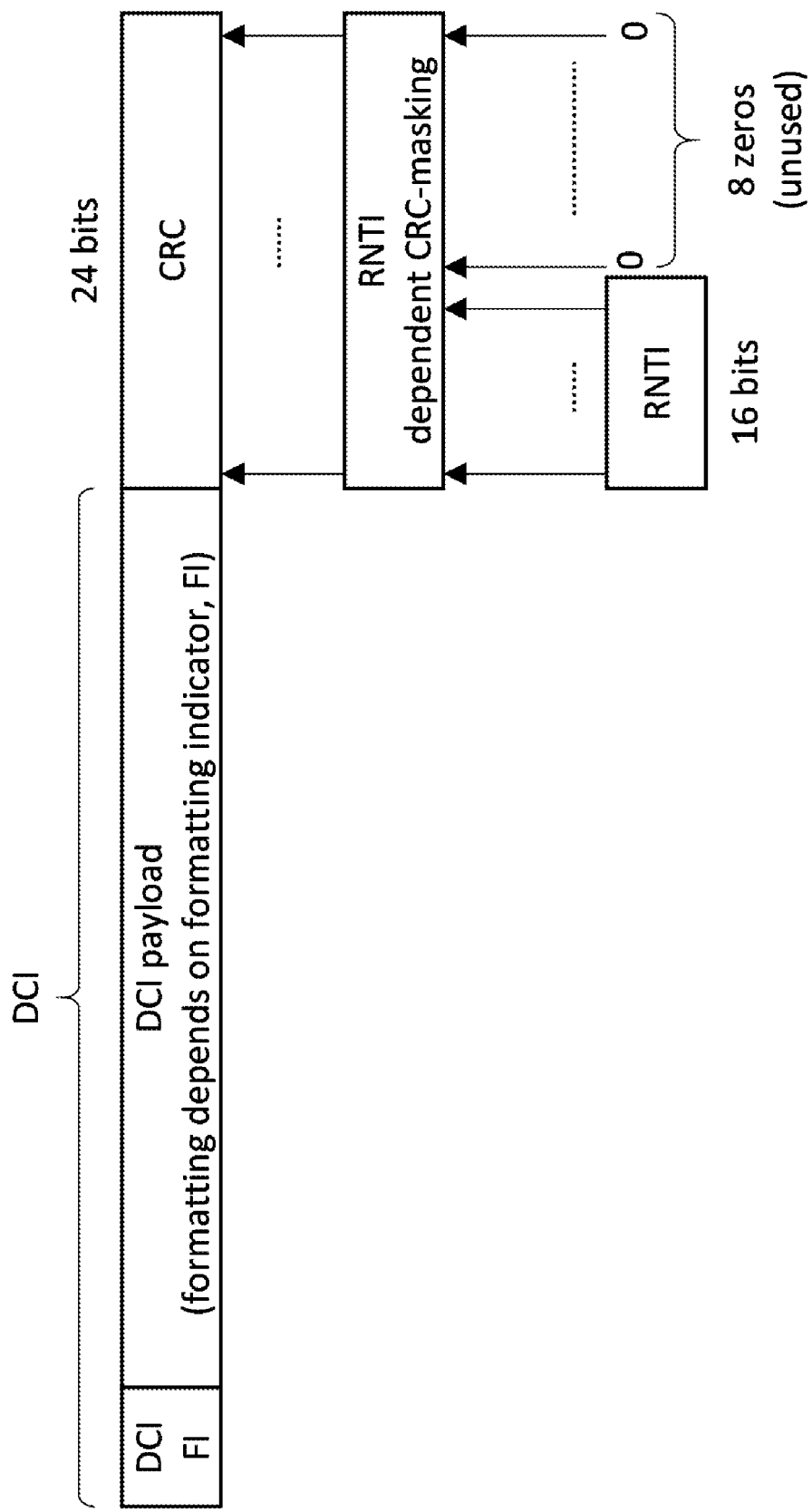
FIG. 4 illustrates an embodiment in which a DCI formatting indicator is embedded into the DCI message.
Figure 5:
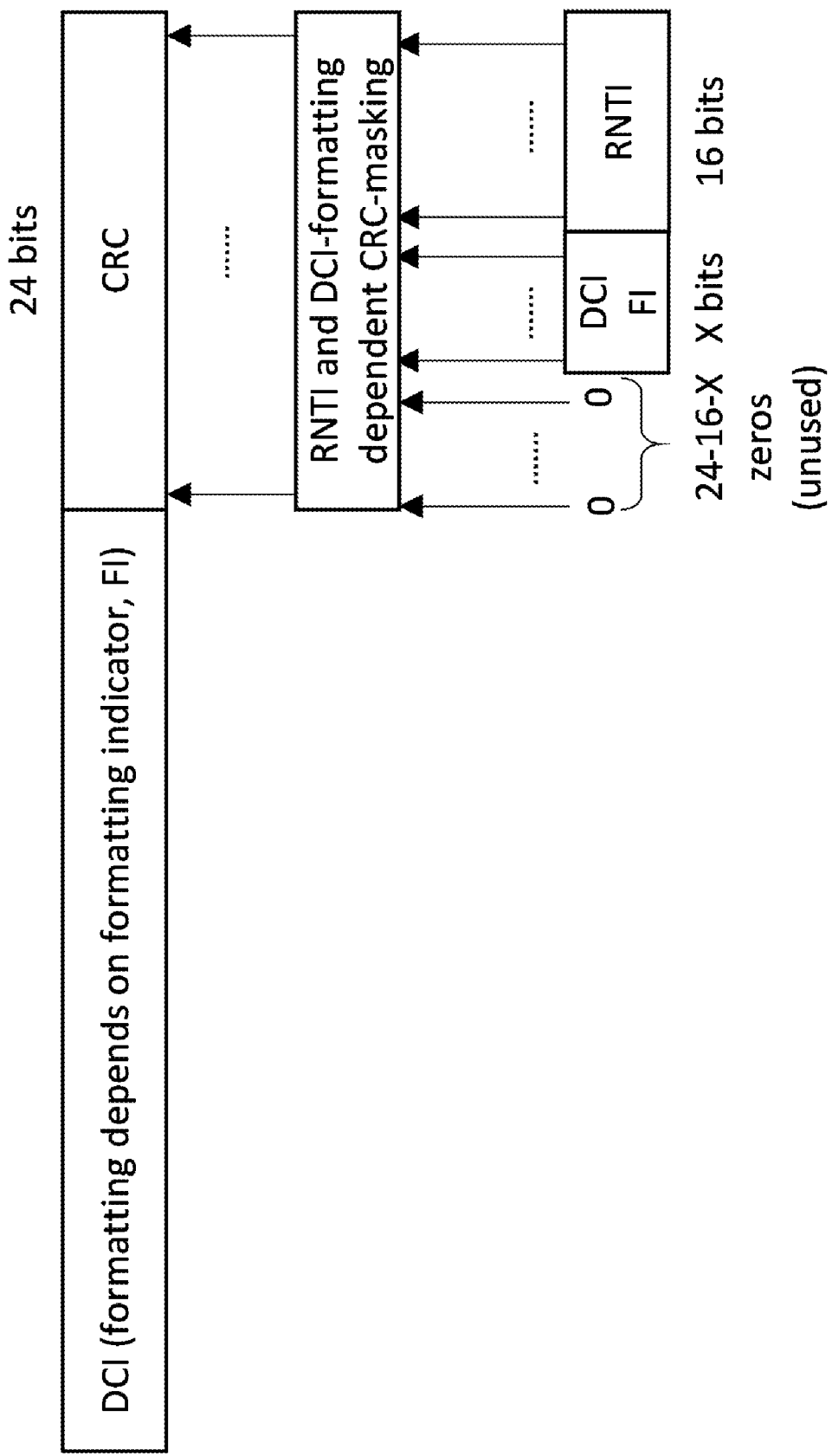
FIG. 5 illustrates another embodiment in which a DCI formatting indicator is embedded into a CRC mask of the CRC of the DCI message.

The scenario in FIG. 2 shows a scenario in which the DCI formatting indicator is an explicit indicator included in the DCI message, and the flexible-interpretation DCI configuration (e.g., the DCI formatting indicator size) is performed by RRC. FIG. 3 illustrates an alternative embodiment in which the DCI formatting indicator is embedded into a CRC mask of the CRC of the DCI message. In this example, the DCI formatting indicator size may be predefined (e.g., fixed) or configured via higher layer signaling (e.g., RRC signaling). FIG. 5 illustrates a similar alternative as that illustrated in FIG. 3 but where the positions of the RNTI and zeros is reversed.

In other embodiments, the flexible DCI format interpretation is configured using RRC as illustrated in FIG. 2, but is not activated until indicated to the UE by lower layer configuration, e.g., using a Medium Access Control (MAC) control element or L1 signaling.

In other embodiments, the DCI formatting indicator is an implicit indicator. In other words, which of two or more DCI interpretations to be used by the UE is implicitly signaled to the UE. This implicit indication may be provided by a reception method, e.g. using specific RNTI, CORESET, or search space. In such embodiments, the UE is configured/informed with an interpretation based on, e.g., which CORESET or search space the DCI is received. In some such embodiments, the number of bits for the DCI formatting indicator in DCI may be zero (X=0).

Figure 6:
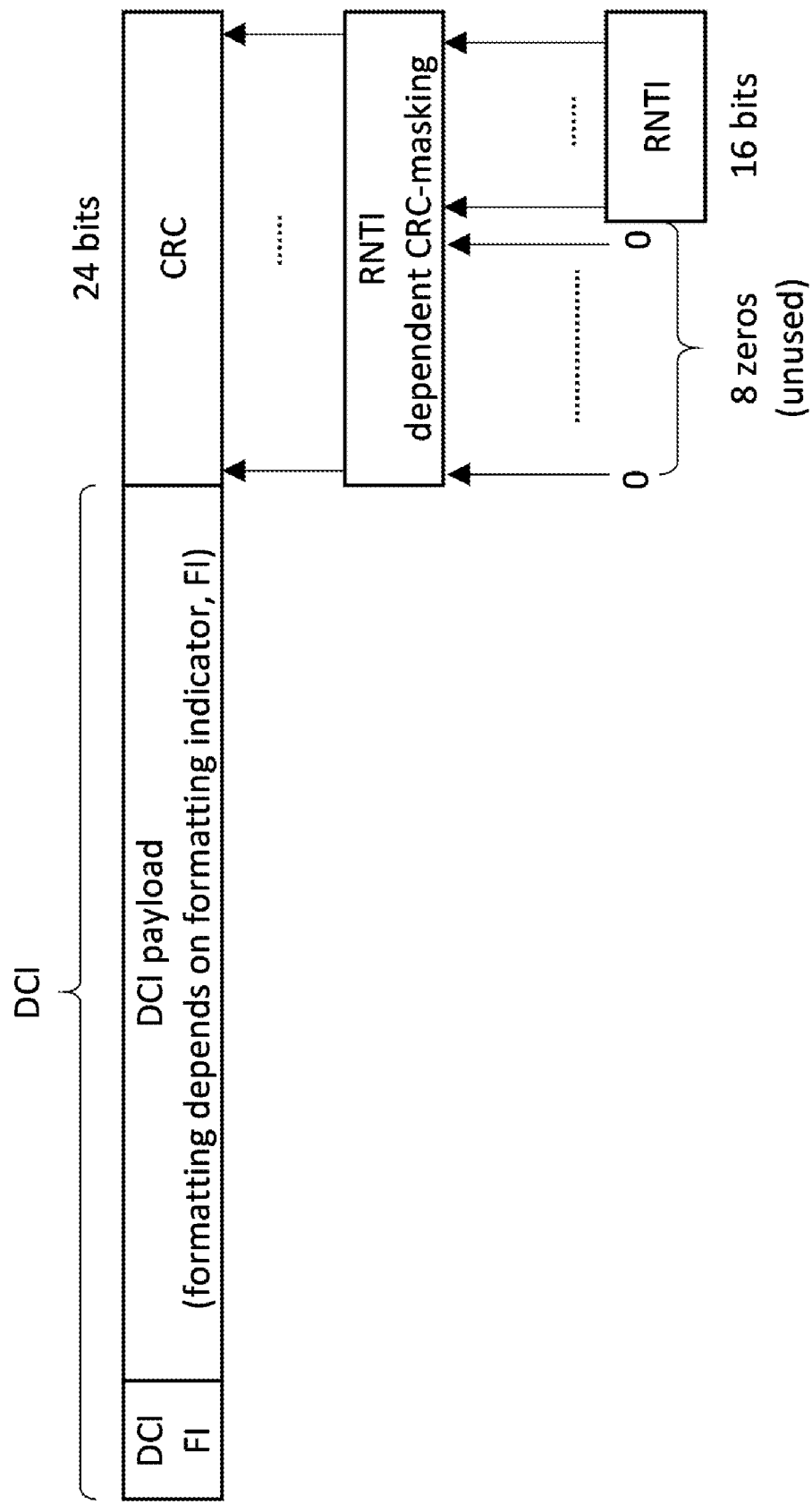
FIG. 6 illustrates another embodiment in which a DCI formatting indicator is embedded into the DCI message.

In some embodiments, the DCI formatting indicator is implicit where the indicator is part of the scrambling the DCI CRC, see FIG. 3. The DCI CRC is scrambled with the RNTI to indicate to which RNTI the DCI is addressed to. In NR, the number of CRC bits is 24 while the RNTI consists of only 16 bits. Hence, there are 8 bits of the CRC where scrambling is not performed. In some embodiments, with an implicit DCI formatting indicator, some of those "un-used" 8 bits may be configured to be used for DCI formatting indication. Note that, in other embodiments, the DCI formatting indicator is embedded in the DCI message itself (see, e.g., FIG. 4 and FIG. 6).

The indication can also combine explicit and implicit methods wherein, e.g., a first set of different DCI formatting is associated with a first CORESET while a second set of different DCI formatting is associated with a second CORESET. For example, if X=2 there are 4 different DCI formatting that can be differentiated for each CORESET. With two CORESETs there are in total 8 different DCI formatting that can differentiated.

Embodiments in which DCI format 0-3/1-3 is differentiated from DCI format 0-0/1-0 will now be described. When aligning DCI format 0-3/1-3 sizes with DCI format 0-0/1-0, one problem is how to differentiate DCI format 0-3/1-3 from DCI format 0-0/1-0.

Since both DCI format x-3 and x-1 are located in UE-Specific Search Space (USS), they cannot be separated by search space type.

One solution is to use special combinations of bit fields to differentiate.

In another solution, DCI format x-3 is differentiated from DCI format x-1 by a CRC mask. In general, the CRC mask can be n bit, where $n \leq n_{max}$, and $n_{max}$ is the number of CRC bits applied to DCI. For NR Rel-15, 24 bit CRC polynomial is used, hence $n_{max}$=24.

For PDCCH, a 16-bit RNTI is masked to the last 16 CRC bits. A 16-bit DCI mask is additionally applied to the last 17 CRC bits, where an example of the DCI mask sequence is shown in Table 4.

TABLE 4

| DCI format mask | |
|---|---|
| DCI format | DCI mask m |
| 0-0, 1-0 | <0, 0, 0, 0, 0, 0, 0, 0, 0, 0, 0, 0, 0, 0, 0, 0, 0> |
| 0-3, 1-3 | <1, 1, 1, 1, 1, 1, 1, 1, 1, 1, 1, 1, 1, 1, 1, 1, 1> |

This can be realized by changing the 38.212 specification as follows:

After attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, and the corresponding DCI format mask $m_0, m_1, \ldots, m_{16}$ to form the sequence of bits $c_0, c_1, c_2, c_3, \ldots, c_{K-1}$. The relation between $c_k$ and $b_k$ is:

$$c_k = b_k \text{ for } k=0,1,2,\ldots,A+6$$

$$c_k = (b_k + m_0) \bmod 2 \text{ for } k=A+7,$$

$$c_k = (b_k + x_{rnti,k-A-8} + m_{k-A-7}) \bmod 2 \text{ for } k=A+8, A+9, A+10, \ldots, A+23.$$

An embodiment that differentiates using search space will now be described.

Let the new DCI be denoted 0-x and 1-x for UL and DL, respectively.

With implicit indication of the new and fallback DCI formats using the search space method, the RRC specification needs the changes indicated below with bold, italicized, and underlined text:

```
-- ASN1START
-- TAG-SEARCHSPACE-START
SearchSpace ::=                           SEQUENCE {
    searchSpaceId                             SearchSpaceId,
    controlResourceSetId                      ControlResourceSetId OPTIONAL, -- Cond SetupOnly
    monitoringSlotPeriodicityAndOffset        CHOICE {
        sl1                                       NULL,
        sl2                                       INTEGER (0..1),
        sl4                                       INTEGER (0..3),
        sl5                                   INTEGER (0..4),
        sl8                                       INTEGER (0..7),
        sl10                                      INTEGER (0..9),
        Sl16                                      INTEGER (0..15),
        sl20                                      INTEGER (0..19)
    }
    monitoringSymbolsWithinSlot               BIT STRING (SIZE (14)) OPTIONAL, -- Cond Setup
    nrofCandidates                            SEQUENCE {
        aggregationLevel1                         ENUMERATED {n0, n1, n2, n3, n4, n5, n6, n8},
        aggregationLevel2                         ENUMERATED {n0, n1, n2, n3, n4, n5, n6, n8},
        aggregationLevel4                         ENUMERATED {n0, n1, n2, n3, n4, n5, n6, n8},
        aggregationLevel8                         ENUMERATED {n0, n1, n2, n3, n4, n5, n6, n8},
        aggregationLevel16                        ENUMERATED {n0, n1, n2, n3, n4, n5, n6, n8}
    }                    OPTIONAL, -- Cond Setup
    searchSpaceType                           CHOICE {
        common                                    SEQUENCE {
            dci-Format0-0-AndFormat1-0                SEQUENCE {
            ...
            }        OPTIONAL,-- Need R
            dci-Format0-X-AndFormat1-X                SEQUENCE {
            ...
            }        OPTIONAL, - - Need R
            dci-Format2-0  SEQUENCE {
                nrofCandidates-SFI        SEQUENCE {
                    aggregationLevel1         ENUMERATED {n1, n2}         OPTIONAL,-- Need R
                    aggregationLevel2         ENUMERATED {n1, n2}         OPTIONAL,-- Need R
                    aggregationLevel4         ENUMERATED {n1, n2}         OPTIONAL,-- Need R
```

```
                aggregationLevel8      ENUMERATED {n1, n2}       OPTIONAL,-- Need R
                aggregationLevel16     ENUMERATED {n1, n2}       OPTIONAL -- Need R
            },
            ...
        }           OPTIONAL,-- Need R
        dci-Format2-1    SEQUENCE {
            ...
        }           OPTIONAL,-- Need R
        dci-Format2-2    SEQUENCE {
            ...
        }           OPTIONAL,-- Need R
        dci-Format2-3    SEQUENCE {
            monitoringPeriodicity ENUMERATED {n1, n2, n4, n5, n8, n10, n16, n20 } OPTIONAL,
            nrofPDCCH-Candidates  ENUMERATED {n1, n2},
            ...
        }           OPTIONAL -- Need R
    },
    ue-Specific              SEQUENCE {
        dci-Formats                 ENUMERATED {formats0-0-And-1-0, formats0-1-And-1-1,
                                                formats0-X-And-1-X },
        ...
    }
  }            OPTIONAL -- Cond Setup
}
```

The UE may in this way be configured with a search space Identifier (ID) "0" such that the sequence of DCI formats equals {formats0-0-And-1-0, formats0-1-And-1-1} and a search space ID "1" such that sequence of DCI formats equals {formats0-X-And-1-X, formats0-1-And-1-1}. To avoid format conflict, the UE shall not expect to be configured with a search space including for new and fallback DCI format. To enable the UE to monitor both new and fallback DCI formats at same monitoring occasion, the UE needs to be configured with an additional search space ID for new DCI format.

An embodiment that differentiates using the last un-scrambled bit in legacy will now be described.

Without impacting the decoding procedure nor the RNTI-masking, the last un-scrambled bit can be used as indicator of new format. The 38.212 specification can be changed as follows:

After attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, and the corresponding DCI format mask $m_0$ to form the sequence of bits $c_0, c_1, c_2, c_3, \ldots, c_{K-1}$. The relation between $c_k$ and $b_k$ is:

$$c_k = b_k \text{ for } k=0,1,2,\ldots,A+6$$

$$c_k = (b_k + m_{k-A-7}) \bmod 2 \text{ for } k=A+7,$$

$$c_k = (b_k + x_{k-A-8}) \bmod 2 \text{ for } k=A+8, A+9, A+10, \ldots, A+23.$$

Figure 7:
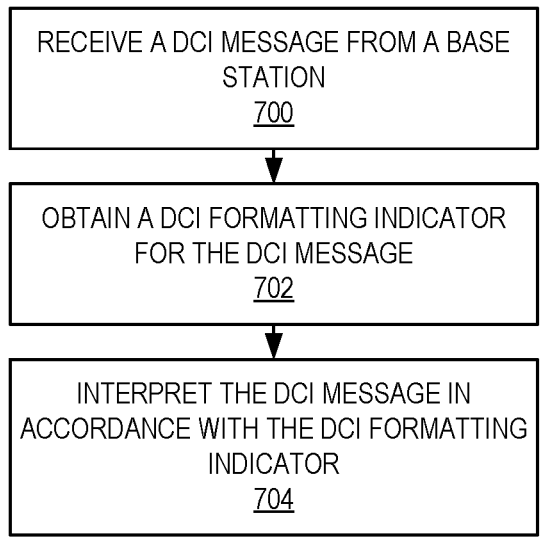
FIG. 7 is a flow chart that illustrates the operation of a wireless device in accordance with at least some of the embodiments of the present disclosure.

FIG. 7 is a flow chart that illustrates the operation of a wireless device (e.g., a UE) such as, e.g., a wireless device 112 in accordance with at least some of the embodiments of the present disclosure described herein. As illustrated, the wireless device receives a DCI message from a base station (step 700) and obtains a DCI formatting indicator for the DCI message (step 702). As discussed above, the DCI formatting indicator is an indicator related to a flexible-interpretation DCI format, wherein the flexible-interpretation DCI format is a DCI format for which bits are interpreted differently based on the DCI formatting indicator. As discussed above, the DCI formatting indicator may be an explicit indicator (e.g., one or more bits in the DCI message), an implicit indicator (e.g., embedded in a CRC mask of the CRC for the DCI message, a specific RNTI, a CORESET or search space in which the DCI message is received, TM or monitoring format parameter, or the like), or a combination thereof. The wireless device interprets the received DCI message in accordance with the DCI formatting indicator (step 704). More specifically, the wireless device determines a predefined or preconfigured DCI format interpretation for the obtained DCI format indicator (e.g., mapped to the obtained DCI format indicator) and interprets the received DCI message in accordance with the predefined or preconfigured DCI format interpretation for the obtained DCI format indicator. For example, the DCI formatting indictor may be mapped to one of two or more predefined DCI interpretations where the wireless device uses the interpretation that is mapped to the obtained DCI formatting indicator.

Figure 8:
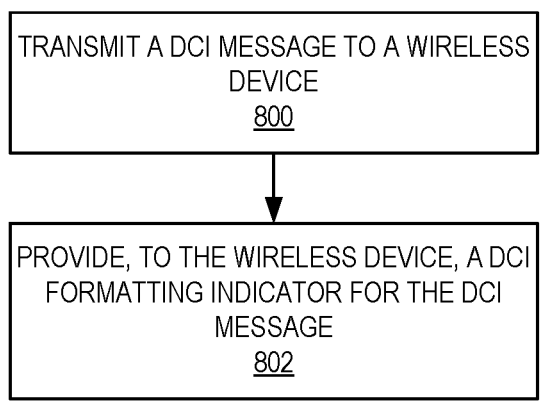
FIG. 8 is a flow chart that illustrates the operation of a base station in accordance with at least some embodiments of the present disclosure.

FIG. 8 is a flow chart that illustrates the operation of a base station (e.g., a gNB) such as, e.g., a base station 102 in accordance with at least some embodiments of the present disclosure described herein. As illustrated, the base station transmits a DCI message to a wireless device (step 800) and provides, to the wireless device, a DCI formatting indicator for the DCI message (step 802). Again, the DCI formatting indicator is an indicator related to a flexible-interpretation DCI format, wherein the flexible-interpretation DCI format is a DCI format for which bits are interpreted differently based on the DCI formatting indicator. As discussed above, the DCI formatting indicator may be an explicit indicator (e.g., one or more bits in the DCI message), an implicit indicator (e.g., embedded in CRC mask of the CRC for the DCI message, a specific RNTI, a CORESET or search space in which the DCI message is received, TM or monitoring format parameter, or the like), or a combination thereof.

Figure 9:
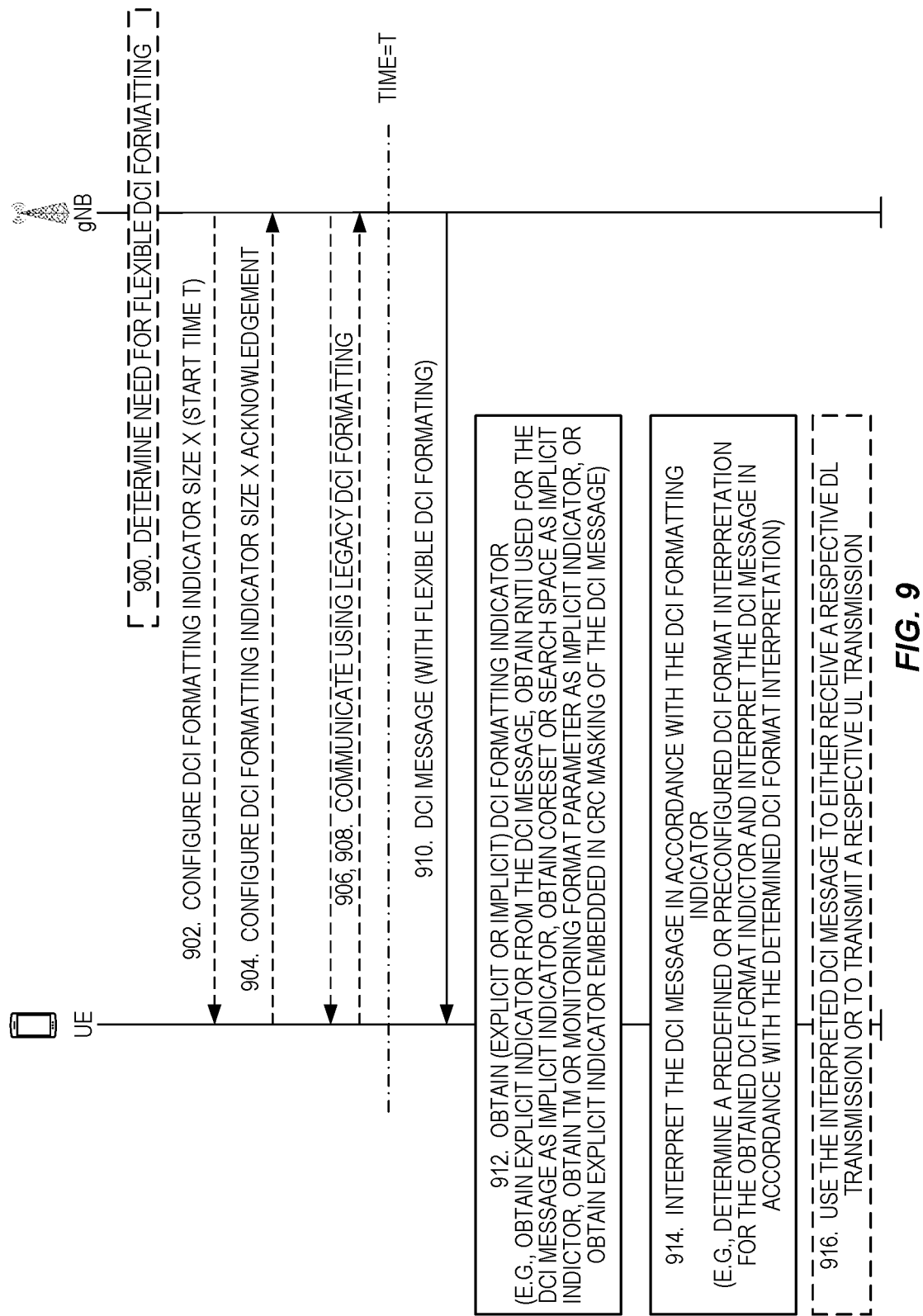
FIG. 9 illustrates the operation of a User Equipment (UE) and a base station in accordance with at least some aspects of the embodiments.

FIG. 9 illustrates the operation of a UE (e.g., a wireless device 112) and a base station (e.g., a base station 102 such as a gNB) in accordance with at least some aspects of the embodiments described herein. Note that optional steps are represented by dashed lines. As illustrated, optionally, base station determines that flexible DCI formatting is desired (step 900). Optionally, the base station sends, and the UE receives, a configuration of a DCI formatting indicator size (step 902). Optionally, the UE may acknowledge the configuration of the DCI formatting indicator size (step 904).

Optionally, the configuration in step 902 may also configure a start time (T) for flexible DCI formatting. In some embodiments, the configuration of step 902 is via higher layering signaling (e.g., RRC signaling). If a start time (T) is configured, optionally, prior to the start time (T), the base station may transmit and the UE may receive a DCI message (step 906) and the UE may interpret this DCI message in accordance with legacy DCI format interpretation (908). The UE may then operate to either receive a DL transmission or transmit an UL transmission in accordance with the interpreted DCI message.

The base station transmits and the UE receives a DCI message (step 910). The UE obtains a DCI formatting indicator for the DCI message (step 912). As described herein, the DCI formatting indicator is an indicator related to a flexible-interpretation DCI format, wherein the flexible-interpretation DCI format is a DCI format for which bits are interpreted differently based on the DCI formatting indicator. Optionally, if the DCI formatting indicator size is configured in step 902, the size of the DCI formatting indicator is equal to the configured DCI formatting indicator size. The UE interprets the DCI message in accordance with the DCI formatting indicator (step 914). Optionally, if a start time (T) for flexible DCI formatting is configured in step 902, steps 910, 912, and 914 are performed after the start time (T). Optionally, the UE uses the interpreted DCI message to either receive a respective DL transmission or to transmit a respective UL transmission (step 916).

In some embodiments, the DCI formatting indicator is an explicit indicator.

In some embodiments, the DCI formatting indicator is comprised in the DCI message, and the UE obtains the DCI formatting indicator in step 912 by obtaining the DCI formatting indicator from the DCI message.

In some other embodiments, the DCI formatting indicator is an implicit indictor. In some embodiments, the DCI formatting indicator is an implicit DCI formatting indicator, and the UE obtains the DCI formatting indictor in step 912 by determining a RNTI used for the DCI message received in step 910, wherein the RNTI is the implicit DCI formatting indicator. In some embodiments, the DCI formatting indicator is an implicit DCI formatting indicator, and the UE obtains the DCI formatting indicator in step 912 by determining a CORESET or search space in which the DCI message is received in step 910, wherein the determined CORESET or search space is the implicit DCI formatting indicator. In some embodiments, the DCI formatting indicator is an implicit DCI formatting indicator, and the UE obtains the DCI formatting indicator in step 912 by determining a transmission mode or monitoring format parameter, wherein the determined transmission mode or monitoring format parameter is the implicit DCI formatting indicator.

In some embodiments, the UE obtains the DCI formatting indicator in step 912 by determining a CRC masking for a CRC of the DCI message received in step 910, wherein the DCI formatting indicator is embedded into the CRC masking.

In some other embodiments, the DCI formatting indicator is a combination of an explicit indication and an implicit indication. In some embodiments, the explicit indication is comprised in the DCI message, and the implicit indication is: a RNTI used for the DCI message received in step 910, a CORESET or search space in which the DCI message is received in step 910, an indication embedded into a CRC masking for a CRC of the DCI message received in step 910, or a transmission mode or monitoring format parameter.

In some embodiments, the UE interprets the DCI message in step 914 by determining a predefined or preconfigured DCI format interpretation for the obtained DCI formatting indicator and interpreting the DCI message in accordance with the predefined or preconfigured DCI format interpretation.

In some embodiments, interpreting the DCI message received in step 910 in accordance with the obtained DCI formatting indicator comprises:

if the DCI formatting indicator is a first value, interpreting the DCI message in accordance with a normal (e.g., default) DCI format interpretation; and if the DCI formatting indicator is a second value:

determining a predefined or preconfigured DCI format interpretation mapped to the second value of the DCI formatting indicator; and interpreting the DCI message in accordance with the predefined or preconfigured DCI format interpretation.

In some embodiments, the DCI message received in step 910 is for a current transmission scheduled for the UE, and the UE updates a subset of parameters received in a prior DCI message for a prior transmission scheduled for the UE based on information received in the DCI message, as interpreted in accordance with the DCI formatting indicator.

Figure 10:
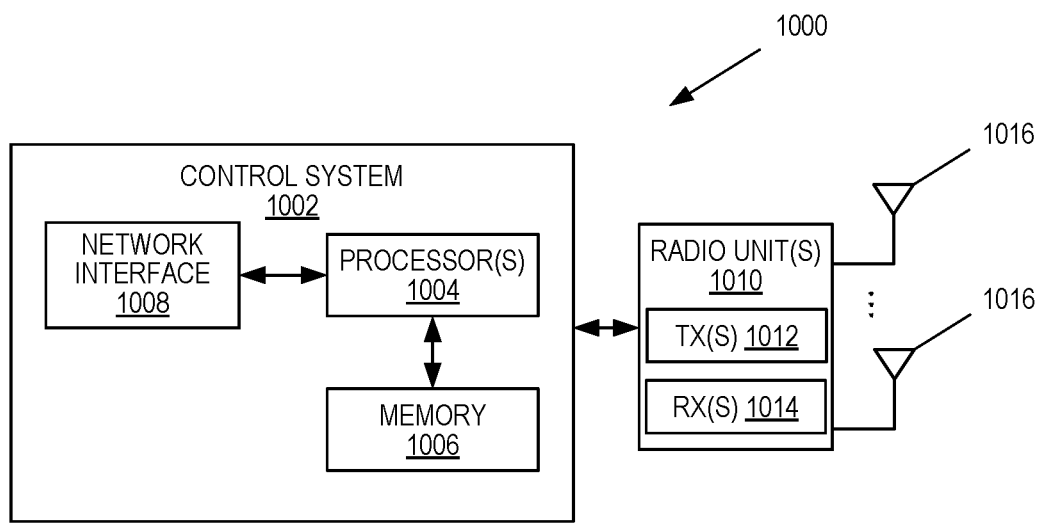
FIGS. 10 to 12 illustrate example embodiments of a radio access node (e.g., a base station)

FIG. 10 is a schematic block diagram of a radio access node 1000 according to some embodiments of the present disclosure. The radio access node 1000 may be, for example, a base station 102 or 106. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 includes one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
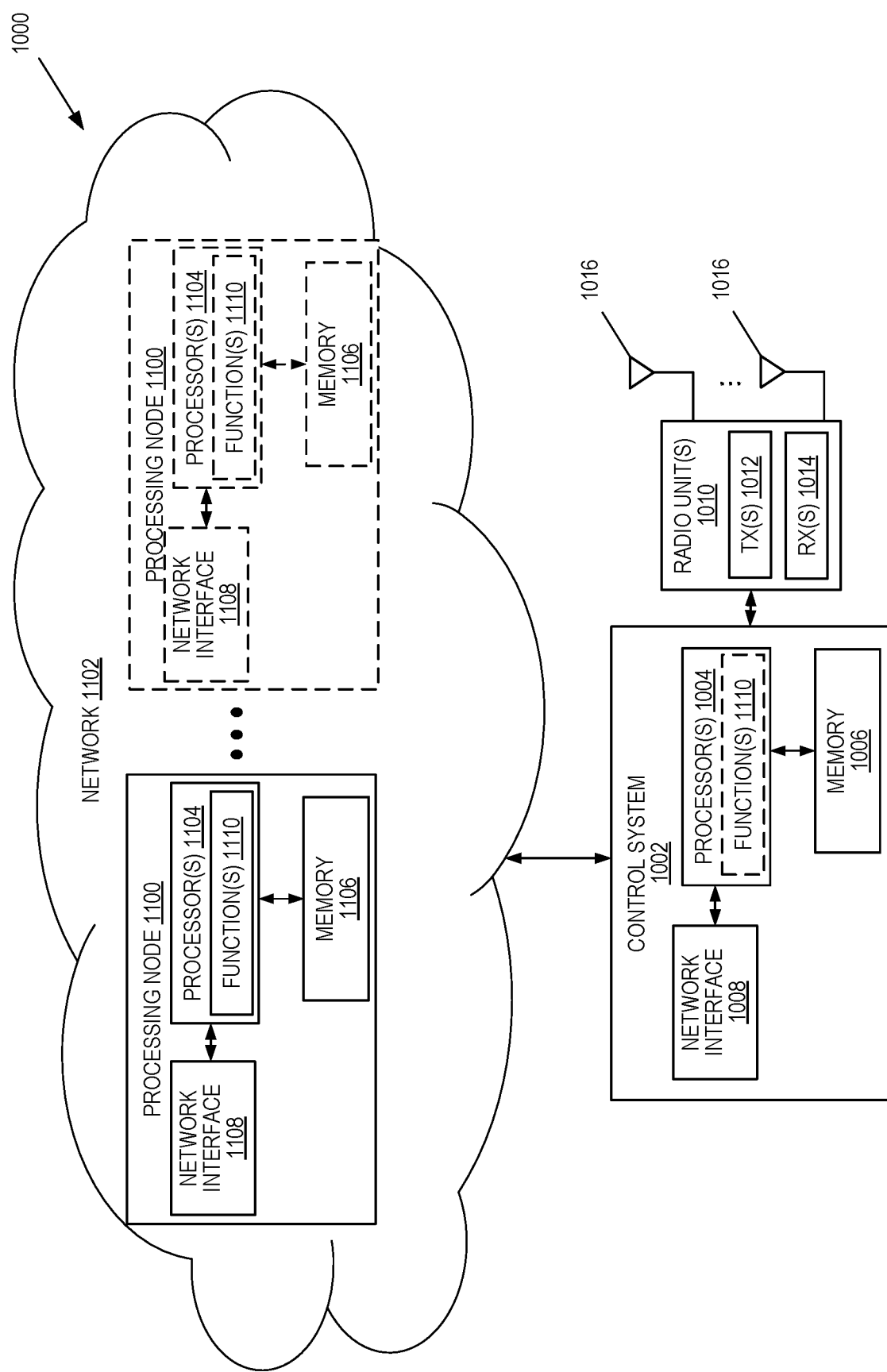

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 includes the control system 1002 that includes the one or more processors 1004 (e.g., CPUs, ASICs, FPGAs, and/or the like), the memory 1006, and the network interface 1008 and the one or more radio units 1010 that each includes the one or more transmitters 1012 and the one or more receivers 1014 coupled to the one or more antennas 1016, as described above. The control system 1002 is connected to the radio unit(s) 1010 via, for example, an optical cable or the like. The control system 1002 is connected to one or more processing nodes 1100 coupled to or included as part of a network(s) 1102 via the network interface 1008. Each processing node 1100 includes one or more processors 1104 (e.g., CPUs, ASICs, FPGAs, and/or the like), memory 1106, and a network interface 1108.

In this example, functions 1110 of the radio access node 1000 described herein are implemented at the one or more processing nodes 1100 or distributed across the control system 1002 and the one or more processing nodes 1100 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
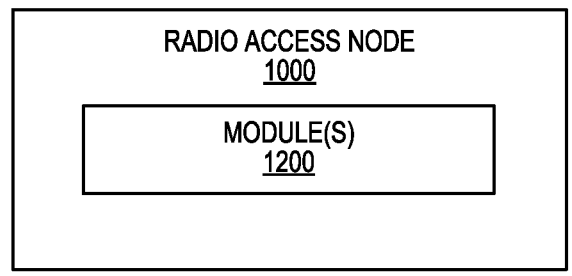

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
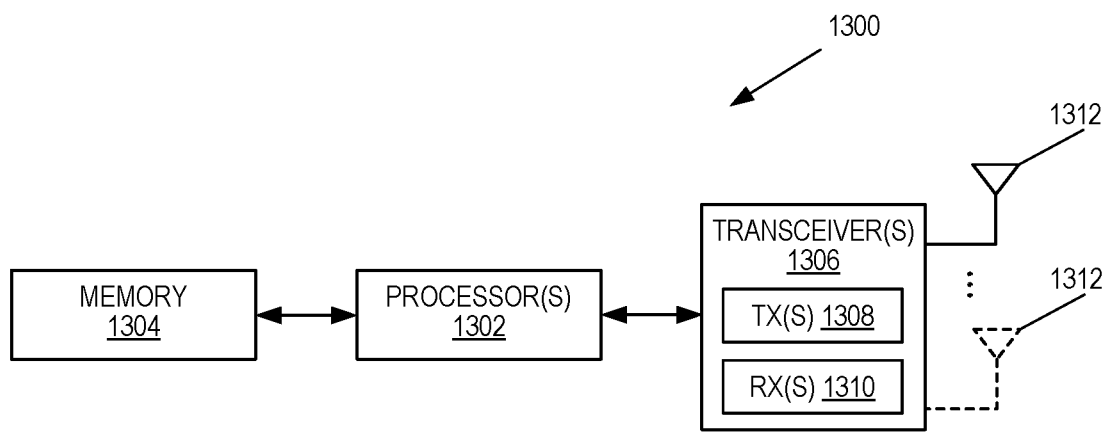
FIGS. 13 and 14 illustrate example embodiments of a wireless device (e.g., a UE)

FIG. 13 is a schematic block diagram of a UE 1300 according to some embodiments of the present disclosure. As illustrated, the UE 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the UE 1300 described above may be fully or partially implemented in software that is, e.g., stored in the memory 1304 and executed by the processor(s) 1302. Note that the UE 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the UE 1300 and/or allowing output of information from the UE 1300), a power supply (e.g., a battery and associated power circuitry), etc.

In some embodiments, a computer program including instructions which, when executed by at least one processor, causes the at least one processor to carry out the functionality of the UE 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
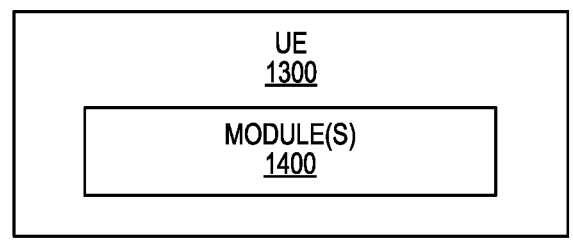

FIG. 14 is a schematic block diagram of the UE 1300 according to some other embodiments of the present disclosure. The UE 1300 includes one or more modules 1400, each of which is implemented in software. The module(s) 1400 provide the functionality of the UE 1300 described herein.

Figure 15:
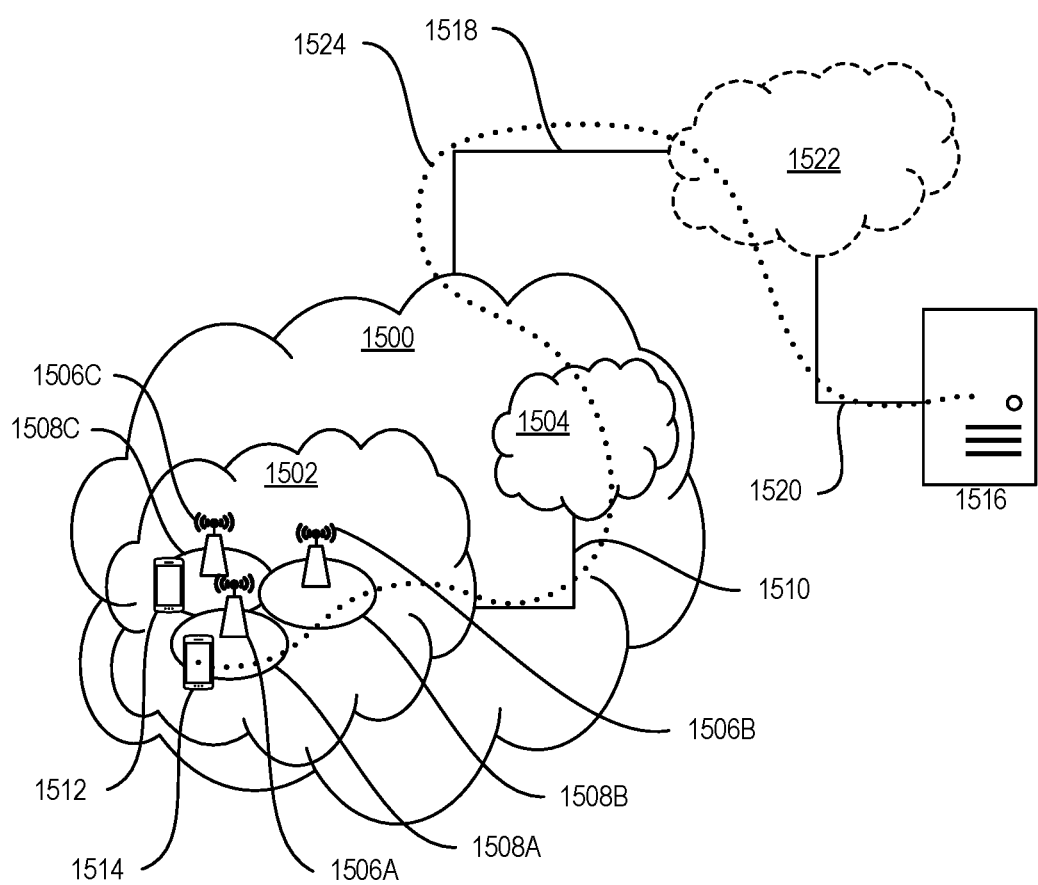
FIG. 15 illustrates an example communication system in which embodiments of the present disclosure may be implemented.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as NBs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer

1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
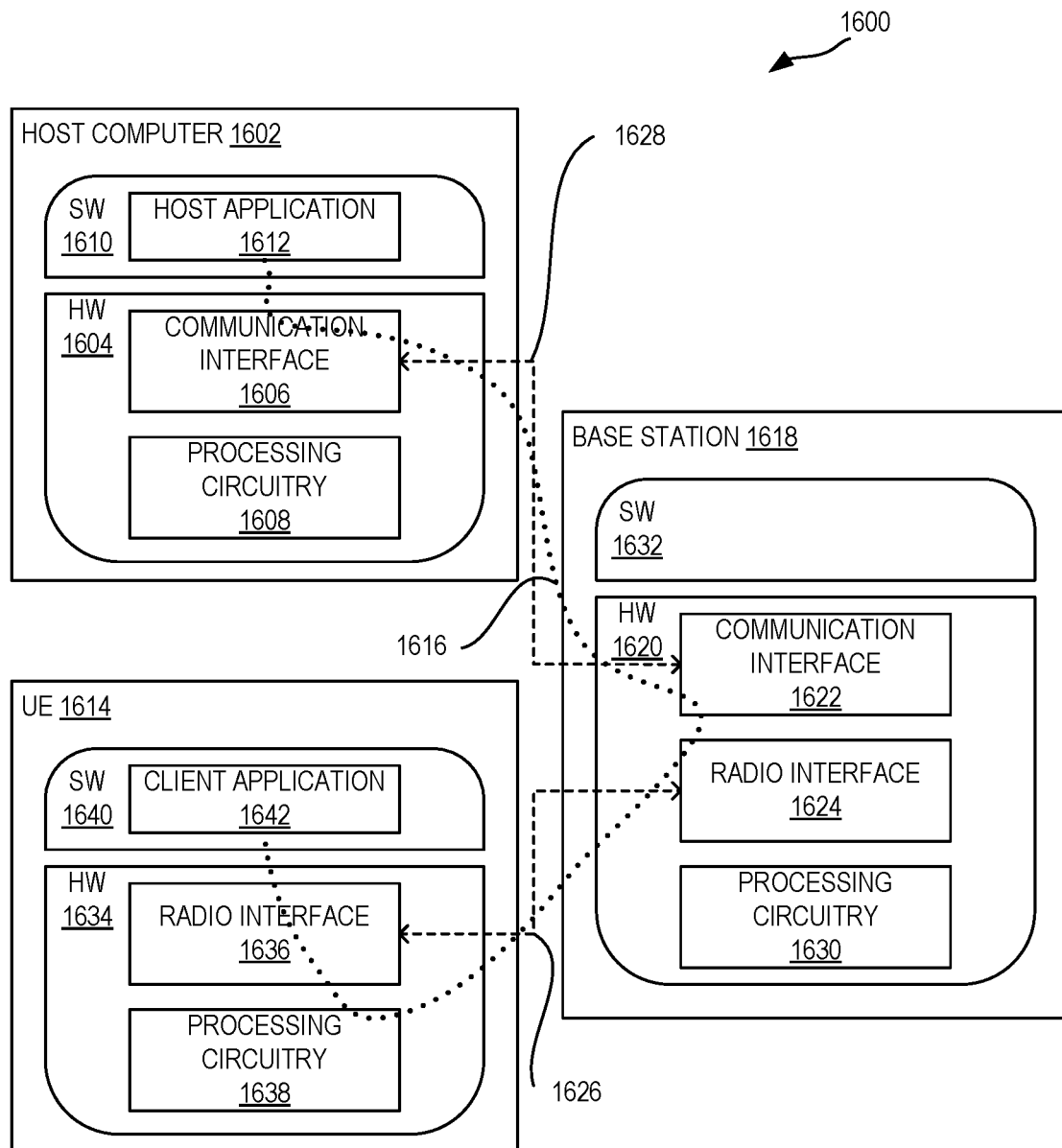
FIG. 16 illustrates an example implementation of the UE, base station, and host computer of FIG. 15.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment. More precisely, the teachings of these embodiments may improve, e.g., data rate, latency, and/or power consumption and thereby provide benefits such as, e.g., reduced user waiting time, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
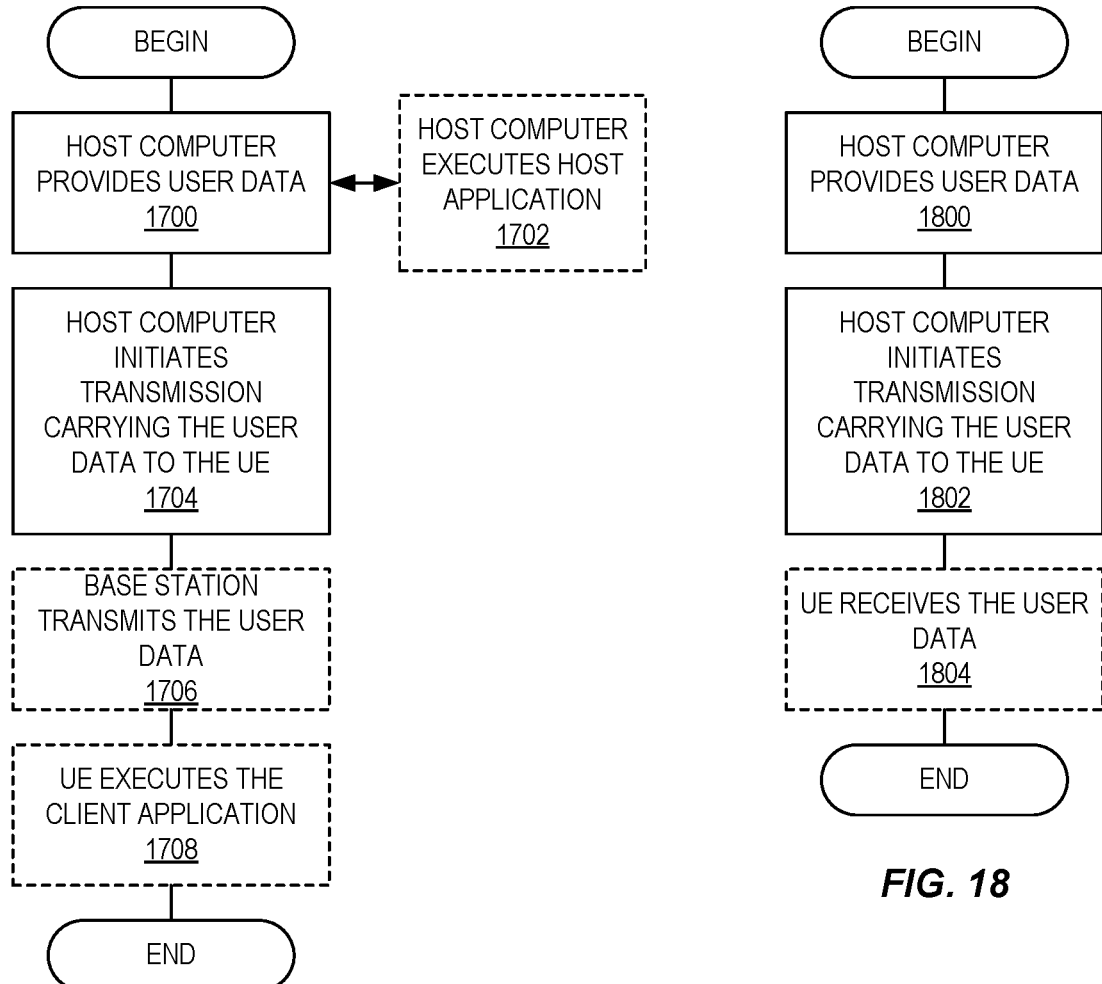

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

GROUP A EMBODIMENTS

Embodiment 1: A method performed by a wireless device for receiving and interpreting a Downlink Control Information, DCI, message, the method comprising:
  receiving a DCI message from a base station;
  obtaining a DCI formatting indicator for the DCI message, wherein the DCI formatting indicator is an indicator related to a flexible-interpretation DCI format, wherein the flexible-interpretation DCI format is a DCI format for which bits are interpreted differently based on the DCI formatting indicator; and
  interpreting the DCI message in accordance with the DCI formatting indicator.

Embodiment 2: The method of embodiment 1 further comprising receiving, from the base station, a configuration of a DCI formatting indicator size, wherein a size of the DCI formatting indicator is equal to the DCI formatting indicator size.

Embodiment 3: The method of embodiment 1 or 2 wherein the DCI formatting indicator is an explicit indicator.

Embodiment 4: The method of embodiment 1 or 2 wherein the DCI formatting indicator is comprised in the DCI message, and obtaining the DCI formatting indicator comprises obtaining the DCI formatting indicator from the DCI message.

Embodiment 5: The method of embodiment 1 or 2 wherein the DCI formatting indicator is an implicit indictor.

Embodiment 6: The method of embodiment 1 or 2 wherein the DCI formatting indicator is an implicit DCI formatting indicator, and obtaining the DCI formatting indicator comprises determining a Radio Network Temporary Identifier, RNTI, used for the DCI message, wherein the RNTI is the implicit DCI formatting indicator.

Embodiment 7: The method of embodiment 1 or 2 wherein the DCI formatting indicator is an implicit DCI formatting indicator, and obtaining the DCI formatting indicator comprises determining a Control Region Set, CORESET, or search space in which the DCI message is received, wherein the determined CORESET or search space is the implicit DCI formatting indicator.

Embodiment 8: The method of embodiment 1 or 2 wherein the DCI formatting indicator is an implicit DCI formatting indicator, and obtaining the DCI formatting indicator comprises determining a transmission mode or monitoring format parameter, wherein the determined transmission mode or monitoring format parameter is the implicit DCI formatting indicator.

Embodiment 9: The method of embodiment 1 or 2 wherein obtaining the DCI formatting indicator comprises determining Cyclic Redundancy Check, CRC, masking for a CRC of the DCI message, wherein the DCI formatting indicator is embedded into the CRC masking.

Embodiment 10: The method of embodiment 1 or 2 wherein the DCI formatting indicator is a combination of an explicit indication and an implicit indication.

Embodiment 11: The method of embodiment 10 wherein:
the explicit indication is comprised in the DCI message; and
the implicit indication is: a Radio Network Temporary Identifier, RNTI, used for the DCI message, a Control Region Set, CORESET, or search space in which the DCI message is received, an indication embedded into a Cyclic Redundancy Check, CRC, masking for a CRC of the DCI message, or a transmission mode or monitoring format parameter.

Embodiment 12: The method of any one of embodiments 1 to 11 wherein interpreting the DCI message in accordance with the DCI formatting indicator comprises:
determining a predefined or preconfigured DCI format interpretation for the obtained DCI formatting indicator; and
interpreting the DCI message in accordance with the predefined or preconfigured DCI format interpretation.

Embodiment 13: The method of any one of embodiments 2 to 12 wherein receiving the configuration of the DCI formatting indicator size comprises receiving the configuration of the DCI formatting indicator size via higher layering signaling (e.g., Radio Resource Control, RRC, signaling).

Embodiment 14: The method of any one of embodiments 1 to 13 further comprising:
obtaining a configuration of a start time for interpreting DCI messages in accordance with the DCI formatting indicator;
wherein the steps of receiving the DCI message, obtaining the DCI formatting indicator, and interpreting the DCI message are performed after the start time.

Embodiment 15: The method of embodiment 14 further comprising, prior to the start time:
receiving another DCI message from the base station; and
interpreting the other DCI message in accordance with legacy DCI format interpretation.

Embodiment 16: The method of any one of embodiments 1 to 15 wherein interpreting the DCI message in accordance with the DCI formatting indicator comprises:
if the DCI formatting indicator is a first value, interpreting the DCI message in accordance with a normal (e.g., default) DCI format interpretation; and
if the DCI formatting indicator is a second value:
determining a predefined or preconfigured DCI format interpretation mapped to the second value of the DCI formatting indicator; and
interpreting the DCI message in accordance with the predefined or preconfigured DCI format interpretation.

Embodiment 17: The method of any one of embodiments 1 to 16 wherein the DCI message is for a current transmission scheduled for the wireless device, and the method further comprises updating a subset of parameters received in a prior DCI message for a prior transmission scheduled for the wireless device based on information received in the DCI message, as interpreted in accordance with the DCI formatting indicator.

Embodiment 18: The method of any of the previous embodiments, further comprising:
providing user data; and
forwarding the user data to a host computer via a transmission to the base station.

GROUP B EMBODIMENTS

Embodiment 19: A method performed by a base station for providing Downlink Control Information, DCI, having a flexible-interpretation, the method comprising:
transmitting a DCI message to a wireless device; and
providing, to the wireless device, a DCI formatting indicator for the DCI message, wherein the DCI formatting indicator is an indicator related to a flexible-interpretation DCI format, wherein the flexible-interpretation DCI format is a DCI format for which bits are interpreted differently based on the DCI formatting indicator.

Embodiment 20: The method of embodiment 19 further comprising providing, to the wireless device, a configuration of a DCI formatting indicator size, wherein a size of the DCI formatting indicator is equal to the DCI formatting indicator size.

Embodiment 21: The method of embodiment 19 or 20 wherein the DCI formatting indicator is an explicit indicator.

Embodiment 22: The method of embodiment 19 or 20 wherein the DCI formatting indicator is comprised in the DCI message, and providing the DCI formatting indicator comprises providing the DCI formatting indicator in the DCI message.

Embodiment 23: The method of embodiment 19 or 20 wherein the DCI formatting indicator is an implicit indictor.

Embodiment 24: The method of embodiment 19 or 20 wherein the DCI formatting indicator is an implicit DCI formatting indicator, and providing the DCI formatting indicator comprises transmitting the DCI message using a specific Radio Network Temporary Indicator, RNTI, wherein the specific RNTI is the implicit DCI formatting indicator.

Embodiment 25: The method of embodiment 19 or 20 wherein the DCI formatting indicator is an implicit DCI formatting indicator, and providing the DCI formatting indicator comprises transmitting the DCI message within a Control Region Set, CORESET, or search space, wherein the CORESET or search space is the implicit DCI formatting indicator.

Embodiment 26: The method of embodiment 19 or 20 wherein the DCI formatting indicator is an implicit DCI formatting indicator, and providing the DCI formatting indicator comprises providing, to the wireless device, a configuration of a transmission mode or monitoring format parameter, wherein the configuration of the transmission mode or monitoring format parameter is the implicit DCI formatting indicator.

Embodiment 27: The method of embodiment 19 or 20 wherein providing the DCI formatting indicator comprises embedding the DCI formatting indicator within a Cyclic Redundancy Check, CRC, masking for a CRC of the DCI message.

Embodiment 28: The method of embodiment 19 or 20 wherein the DCI formatting indicator is a combination of an explicit indication and an implicit indication.

Embodiment 29: The method of embodiment 28 wherein:
the explicit indication is comprised in the DCI message; and
the implicit indication is: a Radio Network Temporary Identifier, RNTI, used for the DCI message, a Control Region Set, CORESET, or search space in which the DCI message is received, an indication embedded into a Cyclic Redundancy Check, CRC, masking for a CRC of the DCI message, or a transmission mode or monitoring format parameter.

Embodiment 30: The method of any one of embodiments 20 to 29 wherein providing the configuration of the DCI formatting indicator size comprises transmitting the configuration of the DCI formatting indicator size to the wireless device via higher layering signaling (e.g., Radio Resource Control, RRC, signaling).

Embodiment 31: The method of any one of embodiments 19 to 30 further comprising providing, to the wireless device, a configuration of a start time for interpreting DCI messages in accordance with the DCI formatting indicator.

Embodiment 32: The method of any one of embodiments 19 to 31, further comprising:
obtaining user data; and
forwarding the user data to a host computer or the wireless device.

GROUP C EMBODIMENTS

Embodiment 33: A wireless device for receiving and interpreting a Downlink Control Information, DCI, message, the wireless device comprising:
processing circuitry configured to perform any of the steps of any of the Group A embodiments; and
power supply circuitry configured to supply power to the wireless device.

Embodiment 34: A base station for providing Downlink Control Information, DCI, having a flexible-interpretation, the base station comprising:
processing circuitry configured to perform any of the steps of any of the Group B embodiments; and
power supply circuitry configured to supply power to the base station.

Embodiment 35: A User Equipment, UE, for receiving and interpreting a Downlink Control Information, DCI, message, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 36: A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.

Embodiment 37: The communication system of the previous embodiment further including the base station.

Embodiment 38: The communication system of the previous 2 embodiments, further including the UE, wherein the UE is configured to communicate with the base station.

Embodiment 39: The communication system of the previous 3 embodiments, wherein:
the processing circuitry of the host computer is configured to execute a host application, thereby providing the user data; and
the UE comprises processing circuitry configured to execute a client application associated with the host application.

Embodiment 40: A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the base station performs any of the steps of any of the Group B embodiments.

Embodiment 41: The method of the previous embodiment, further comprising, at the base station, transmitting the user data.

Embodiment 42: The method of the previous 2 embodiments, wherein the user data is provided at the host computer by executing a host application, the method further comprising, at the UE, executing a client application associated with the host application.

Embodiment 43: A User Equipment, UE, configured to communicate with a base station, the UE comprising a radio interface and processing circuitry configured to perform the method of the previous 3 embodiments.

Embodiment 44: A communication system including a host computer comprising:
  processing circuitry configured to provide user data; and
  a communication interface configured to forward user data to a cellular network for transmission to a User Equipment, UE;
  wherein the UE comprises a radio interface and processing circuitry, the UE's components configured to perform any of the steps of any of the Group A embodiments.

Embodiment 45: The communication system of the previous embodiment, wherein the cellular network further includes a base station configured to communicate with the UE.

Embodiment 46: The communication system of the previous 2 embodiments, wherein:
  the processing circuitry of the host computer is configured to execute a host application, thereby providing the user data; and
  the UE's processing circuitry is configured to execute a client application associated with the host application.

Embodiment 47: A method implemented in a communication system including a host computer, a base station, and a User Equipment, UE, the method comprising:
  at the host computer, providing user data; and
  at the host computer, initiating a transmission carrying the user data to the UE via a cellular network comprising the base station, wherein the UE performs any of the steps of any of the Group A embodiments.

Embodiment 48: The method of the previous embodiment, further comprising at the UE, receiving the user data from the base station.

Embodiment 49: A communication system including a host computer comprising:
  communication interface configured to receive user data originating from a transmission from a User Equipment, UE, to a base station;
  wherein the UE comprises a radio interface and processing circuitry, the UE's processing circuitry configured to perform any of the steps of any of the Group A embodiments.

Embodiment 50: The communication system of the previous embodiment, further including the UE.

Embodiment 51: The communication system of the previous 2 embodiments, further including the base station, wherein the base station comprises a radio interface configured to communicate with the UE and a communication interface configured to forward to the host computer the user data carried by a transmission from the UE to the base station.

Embodiment 52: The communication system of the previous 3 embodiments, wherein:
  the processing circuitry of the host computer is configured to execute a host application; and
  the UE's processing circuitry is configured to execute a client application associated with the host application, thereby providing the user data.

Embodiment 53: The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

Embodiment 54: A method implemented in a communication system including a host computer, a base station, and a User Equipment, UE, the method comprising, at the host computer, receiving user data transmitted to the base station from the UE, wherein the UE performs any of the steps of any of the Group A embodiments.

Embodiment 55: The method of the previous embodiment, further comprising, at the UE, providing the user data to the base station.

Embodiment 56: The method of the previous 2 embodiments, further comprising:
  at the UE, executing a client application, thereby providing the user data to be transmitted; and
  at the host computer, executing a host application associated with the client application.

Embodiment 57: The method of the previous 3 embodiments, further comprising:
  at the UE, executing a client application; and
  at the UE, receiving input data to the client application, the input data being provided at the host computer by executing a host application associated with the client application;
  wherein the user data to be transmitted is provided by the client application in response to the input data.

Embodiment 58: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 59: The communication system of the previous embodiment further including the base station.

Embodiment 60: The communication system of the previous 2 embodiments, further including the UE, wherein the UE is configured to communicate with the base station.

Embodiment 61: The communication system of the previous 3 embodiments, wherein:
  the processing circuitry of the host computer is configured to execute a host application; and
  the UE is configured to execute a client application associated with the host application, thereby providing the user data to be received by the host computer.

Embodiment 62: A method implemented in a communication system including a host computer, a base station, and a User Equipment, UE, the method comprising, at the host computer, receiving, from the base station, user data originating from a transmission which the base station has received from the UE, wherein the UE performs any of the steps of any of the Group A embodiments.

Embodiment 63: The method of the previous embodiment, further comprising at the base station, receiving the user data from the UE.

Embodiment 64: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
  3GPP Third Generation Partnership Project
  5G Fifth Generation
  AP Access Point
  ASIC Application Specific Integrated Circuit
  CORESET Control Region Set CPU Central Processing Unit
CRC Cyclic Redundancy Check
DCI Downlink Control Information
DL Downlink
DSP Digital Signal Processor
eNB Enhanced or Evolved Node B
FPGA Field Programmable Gate Array
gNB New Radio Base Station
ID Identifier
LTE Long Term Evolution
MAC Medium Access Control
MCS Modulation and Coding Scheme
MME Mobility Management Entity
MTC Machine Type Communication
NR New Radio
OTT Over-the-Top
PDCCH Physical Downlink Control Channel
P-GW Packet Data Network Gateway
RAM Random Access Memory
Rel Release
RNTI Radio Network Temporary Identifier
ROM Read Only Memory
RRC Radio Resource Control
RRH Remote Radio Head
SCEF Service Capability Exposure Function
TM Transmission Mode
TS Technical Specification
UE User Equipment
UL Uplink
URLLC Ultra-Reliable Low-Latency Communication
USS User Equipment Specific Search Space Those skilled in the art will recognize improvements and modifications to the embodiments of the present disclosure. All such improvements and modifications are considered within the scope of the concepts disclosed herein.

What is claimed is:

1. A method performed by a wireless device for receiving and interpreting a Downlink Control Information, DCI, message, the method comprising:
   receiving, from a base station, a configuration of a DCI formatting indicator size, wherein a size of a DCI formatting indicator is equal to the DCI formatting indicator size;
   obtaining a configuration of a start time for interpreting DCI messages in accordance with the DCI formatting indicator;
   receiving a DCI message from the base station;
   obtaining the DCI formatting indicator for the DCI message, wherein the DCI formatting indicator is a configurably sized indicator related to a flexible-interpretation DCI format, wherein the flexible-interpretation DCI format is a DCI format for which bits are interpreted differently based on the DCI formatting indicator; and
   interpreting the DCI message in accordance with the DCI formatting indicator;
   wherein the steps of receiving the DCI message, obtaining the DCI formatting indicator, and interpreting the DCI message are performed after the start time.

2. The method of claim 1 wherein receiving the configuration of the DCI formatting indicator size comprises receiving the configuration of the DCI formatting indicator size via higher layering signaling.

3. The method of claim 1 wherein the DCI formatting indicator is an explicit indicator.

4. The method of claim 1 wherein the DCI formatting indicator is comprised in the DCI message, and obtaining the DCI formatting indicator comprises obtaining the DCI formatting indicator from the DCI message.

5. The method of claim 1 wherein the DCI formatting indicator is an implicit indicator.

6. The method of claim 1 wherein the DCI formatting indicator is an implicit DCI formatting indicator, and obtaining the DCI formatting indicator comprises determining a Radio Network Temporary Identifier, RNTI, used for the DCI message, wherein the RNTI is the implicit DCI formatting indicator.

7. The method of claim 1 wherein the DCI formatting indicator is an implicit DCI formatting indicator, and obtaining the DCI formatting indicator comprises determining a Control Region Set, CORESET, or search space in which the DCI message is received, wherein the determined CORESET or search space is the implicit DCI formatting indicator.

8. The method of claim 1 wherein the DCI formatting indicator is an implicit DCI formatting indicator, and obtaining the DCI formatting indicator comprises determining a transmission mode or monitoring format parameter, wherein the determined transmission mode or monitoring format parameter is the implicit DCI formatting indicator.

9. The method of claim 1 wherein obtaining the DCI formatting indicator comprises determining Cyclic Redundancy Check, CRC, masking for a CRC of the DCI message, wherein the DCI formatting indicator is embedded into the CRC masking.

10. The method of claim 1 wherein the DCI formatting indicator is a combination of an explicit indicator and an implicit indicator.

11. The method of claim 10 wherein:
    the explicit indicator is comprised in the DCI message; and
    the implicit indicator is: a Radio Network Temporary Identifier, RNTI, used for the DCI message, a Control Region Set, CORESET, or search space in which the DCI message is received, an indicator embedded into a Cyclic Redundancy Check, CRC, masking for a CRC of the DCI message, or a transmission mode or monitoring format parameter.

12. The method of claim 1 wherein interpreting the DCI message in accordance with the DCI formatting indicator comprises:
    determining a predefined or preconfigured DCI format interpretation for the obtained DCI formatting indicator; and
    interpreting the DCI message in accordance with the predefined or preconfigured DCI format interpretation.

13. The method of claim 1 further comprising, prior to the start time:
    receiving another DCI message from the base station; and
    interpreting the other DCI message in accordance with legacy DCI format interpretation.

14. The method of claim 1 wherein interpreting the DCI message in accordance with the DCI formatting indicator comprises:
    if the DCI formatting indicator is a first value, interpreting the DCI message in accordance with a normal DCI format interpretation; and
    if the DCI formatting indicator is a second value:
       determining a predefined or preconfigured DCI format interpretation mapped to the second value of the DCI formatting indicator; and
       interpreting the DCI message in accordance with the predefined or preconfigured DCI format interpretation.

15. The method of claim 1 wherein the DCI message is for a current transmission scheduled for the wireless device, and the method further comprises updating a subset of parameters received in a prior DCI message for a prior transmission scheduled for the wireless device based on information received in the DCI message, as interpreted in accordance with the DCI formatting indicator.

16. A wireless device for receiving and interpreting a Downlink Control Information, DCI, message, the wireless device comprising:
one or more receivers; and
processing circuitry associated with the one or more receivers, the processing circuitry configured to cause the wireless device to:
receive, from a base station, a configuration of a DCI formatting indicator size, wherein a size of a DCI formatting indicator is equal to the DCI formatting indicator size;
obtain a configuration of a start time for interpreting DCI messages in accordance with the DCI formatting indicator;
receive a DCI message from the base station;
obtain the DCI formatting indicator for the DCI message, wherein the DCI formatting indicator is a configurably sized indicator related to a flexible-interpretation DCI format, wherein the flexible-interpretation DCI format is a DCI format for which bits are interpreted differently based on the DCI formatting indicator; and
interpret the DCI message in accordance with the DCI formatting indicator;
wherein the processing circuitry is configured to cause the wireless device to receive the DCI message, obtain the DCI formatting indicator, and interpret the DCI message after the start time.

17. A method performed by a base station for providing Downlink Control Information, DCI, having a flexible-interpretation, the method comprising:
providing, to a wireless device, a configuration of a DCI formatting indicator size, wherein a size of a DCI formatting indicator is equal to the DCI formatting indicator size;
providing, to the wireless device, a configuration of a start time for interpreting DCI messages in accordance with the DCI formatting indicator;
transmitting a DCI message to the wireless device; and
providing, to the wireless device, the DCI formatting indicator for the DCI message, wherein the DCI formatting indicator is a configurably sized indicator related to a flexible-interpretation DCI format, wherein the flexible-interpretation DCI format is a DCI format for which bits are interpreted differently based on the DCI formatting indicator.

18. The method of claim 17 wherein providing the configuration of the DCI formatting indicator size comprises transmitting the configuration of the DCI formatting indicator size to the wireless device via higher layering signaling.

19. The method of claim 17 wherein the DCI formatting indicator is comprised in the DCI message, and providing the DCI formatting indicator comprises providing the DCI formatting indicator in the DCI message.

20. The method of claim 17 wherein the DCI formatting indicator is an implicit DCI formatting indicator, and providing the DCI formatting indicator comprises transmitting the DCI message using a specific Radio Network Temporary Indicator, RNTI, wherein the specific RNTI is the implicit DCI formatting indicator.

21. The method of claim 17 wherein the DCI formatting indicator is an implicit DCI formatting indicator, and providing the DCI formatting indicator comprises transmitting the DCI message within a Control Region Set, CORESET, or search space, wherein the CORESET or search space is the implicit DCI formatting indicator.

22. The method of claim 17 wherein the DCI formatting indicator is an implicit DCI formatting indicator, and providing the DCI formatting indicator comprises providing, to the wireless device, a configuration of a transmission mode or monitoring format parameter, wherein the configuration of the transmission mode or monitoring format parameter is the implicit DCI formatting indicator.

23. The method of claim 17 wherein providing the DCI formatting indicator comprises embedding the DCI formatting indicator within a Cyclic Redundancy Check, CRC, masking for a CRC of the DCI message.

24. The method of claim 17 wherein the DCI formatting indicator is a combination of an explicit indicator and an implicit indicator.

25. The method of claim 24 wherein:
the explicit indicator is comprised in the DCI message; and
the implicit indicator is: a Radio Network Temporary Identifier, RNTI, used for the DCI message, a Control Region Set, CORESET, or search space in which the DCI message is received, an indicator embedded into a Cyclic Redundancy Check, CRC, masking for a CRC of the DCI message, or a transmission mode or monitoring format parameter.

26. A base station for providing Downlink Control Information, DCI, having a flexible-interpretation, the base station comprising:
processing circuitry configured to cause the base station to:
provide, to a wireless device, a configuration of a DCI formatting indicator size, wherein a size of a DCI formatting indicator is equal to the DCI formatting indicator size;
provide, to the wireless device, a configuration of a start time for interpreting DCI messages in accordance with the DCI formatting indicator;
transmit a DCI message to the wireless device; and
provide, to the wireless device, the DCI formatting indicator for the DCI message, wherein the DCI formatting indicator is a configurably sized indicator related to a flexible-interpretation DCI format, wherein the flexible-interpretation DCI format is a DCI format for which bits are interpreted differently based on the DCI formatting indicator.

* * * * *